United States Patent [19]
Tanaka et al.

[11] Patent Number: 5,677,681
[45] Date of Patent: Oct. 14, 1997

[54] CODE TRANSMISSION SYSTEM AND PORTABLE PAGER IN RADIO PAGING SYSTEM

[75] Inventors: Kenya Tanaka; Yasuhiro Yokota, both of Kawasaki, Japan

[73] Assignee: Fujitsu Limited, Kawasaki, Japan

[21] Appl. No.: 447,677

[22] Filed: May 23, 1995

[30] Foreign Application Priority Data

Oct. 8, 1994 [JP] Japan .................. 6-06187648

[51] Int. Cl.$^6$ .................................. H04Q 7/00
[52] U.S. Cl. .................. 340/825.21; 340/825.44; 340/825.58; 455/38.1; 370/314
[58] Field of Search .............. 340/825.21, 825.44, 340/825.48, 825.47, 825.52, 825.58, 311.1; 455/38.1; 379/60; 329/300; 331/179; 332/100; 375/269, 303, 323, 334; 370/312, 313, 314

[56] References Cited

U.S. PATENT DOCUMENTS 5,168,493  12/1992  Nelson et al. .............. 340/825.44 X
5,237,320   8/1993  Sato et al. ................. 340/825.44
5,371,737  12/1994  Nelson et al. .............. 340/825.44 X

FOREIGN PATENT DOCUMENTS

93/24909  12/1993  WIPO .................. 340/825.44

Primary Examiner—Michael Horabik
Assistant Examiner—William H. Wilson, Jr.
Attorney, Agent, or Firm—Greer, Burns & Crain, Ltd.

[57] ABSTRACT

If a code is transmitted at a first transmission rate, a base station modulates the entirety of the code, namely a preamble, a synchronizing signal and a call-data, by two values and transmits them at the first transmission rate. If the code is transmitted at a second transmission rate, which is double the first transmission rate, the base station modulates the preamble and the logically inverted synchronizing signal (obtained by inverting the "1", "0" logic of the original synchronizing signal) by the two values, transmits them at the first transmission rate, modulates the call-data by four values and transmits it at the second transmission rate. As a result, it suffices to provide the pager with a single common preamble detector and a single common synchronizing detector, irrespective of the transmission rate. Moreover, by detecting the synchronizing signal or its inverted version, it is possible to determine whether the call-data has been modulated by two values or four values, thereby assuring that the call-data following the synchronizing signal can be modulated correctly.

9 Claims, 24 Drawing Sheets

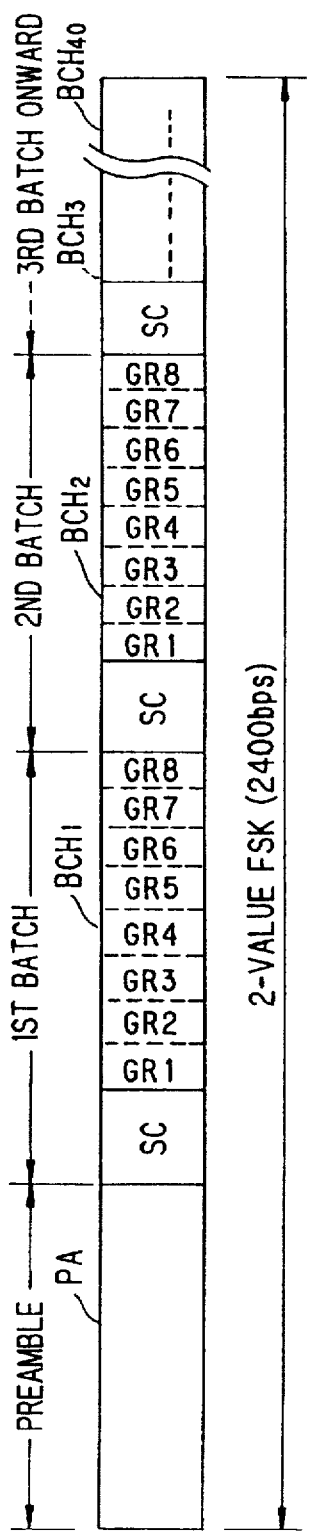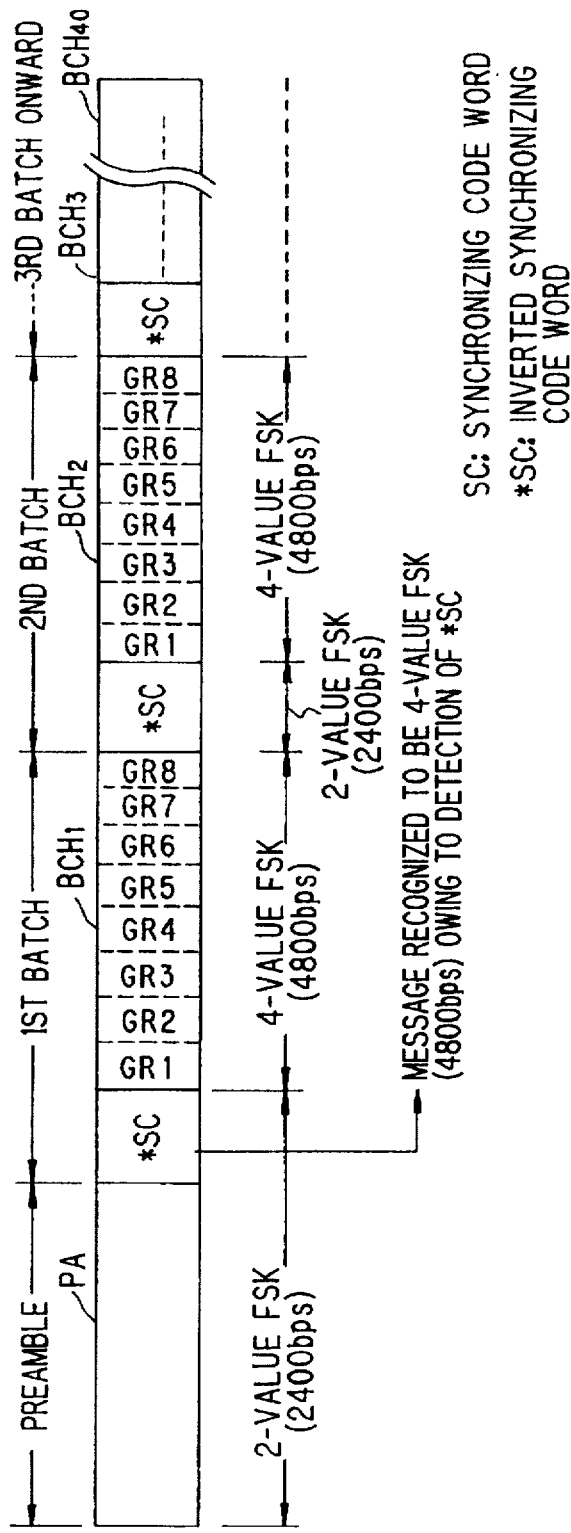

FIG. 5
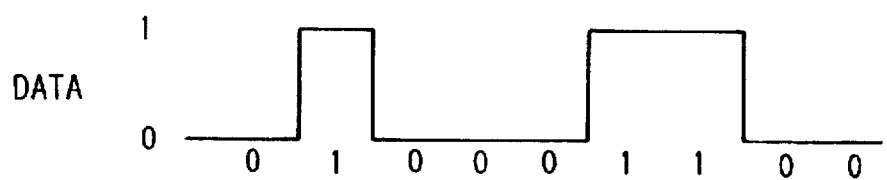
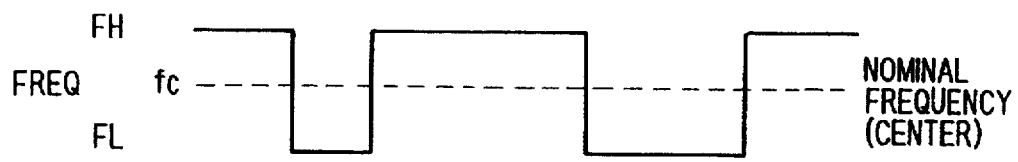
FIG. 6
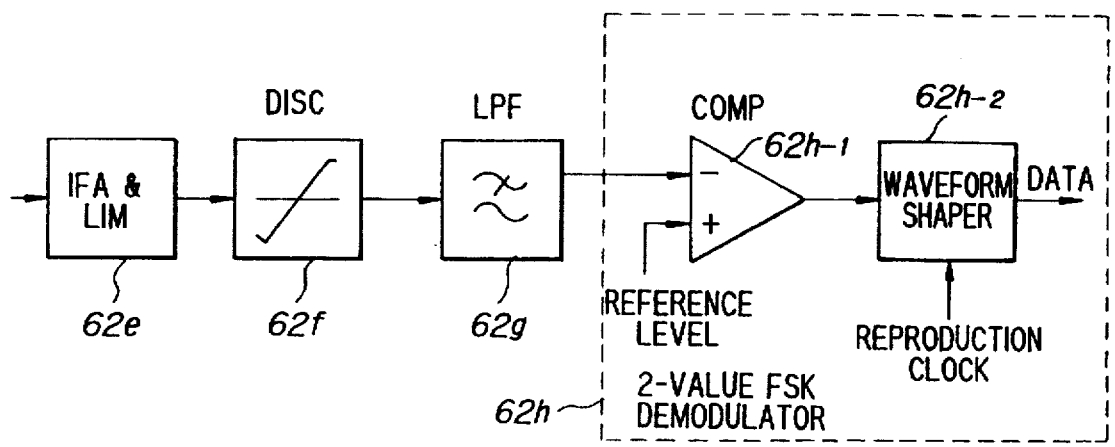

FIG. 7
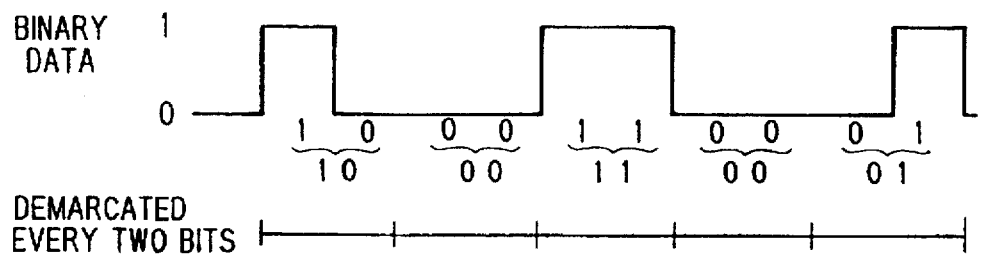
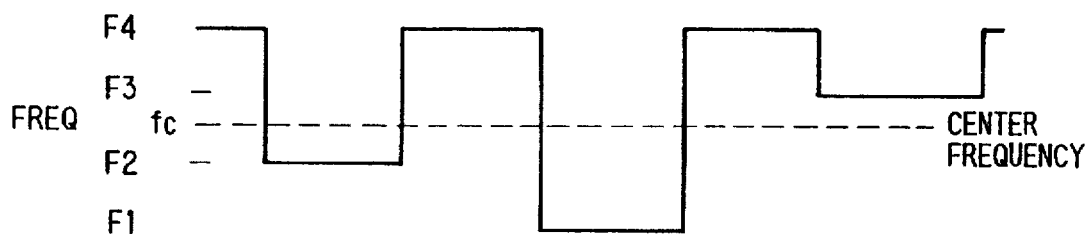
FIG. 8
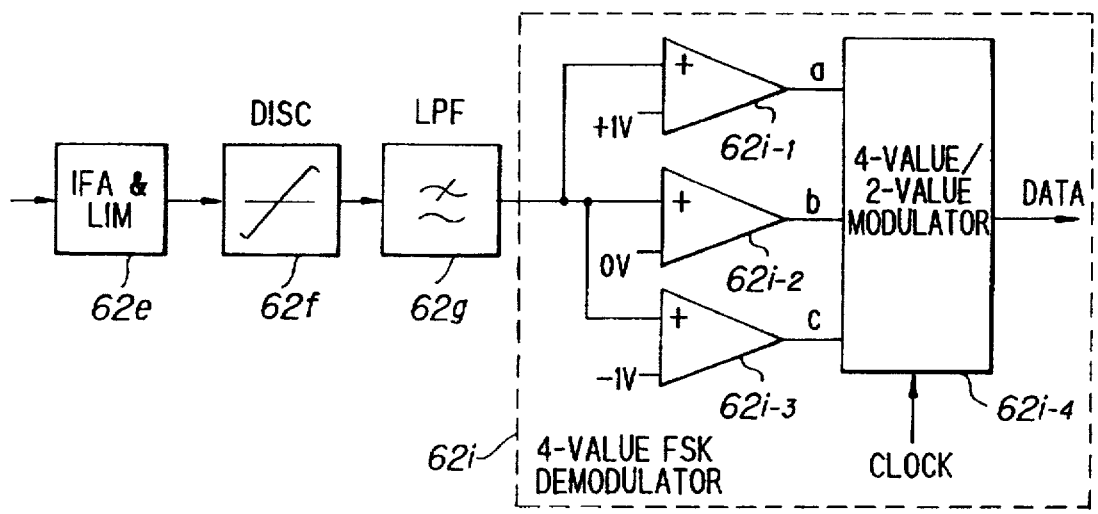

| | a | b | c |
|---|---|---|---|
| 0 0 | H | (H) | (H) |
| 0 1 | L | H | (H) |
| 1 0 | (L) | L | H |
| 1 1 | (L) | (L) | L |

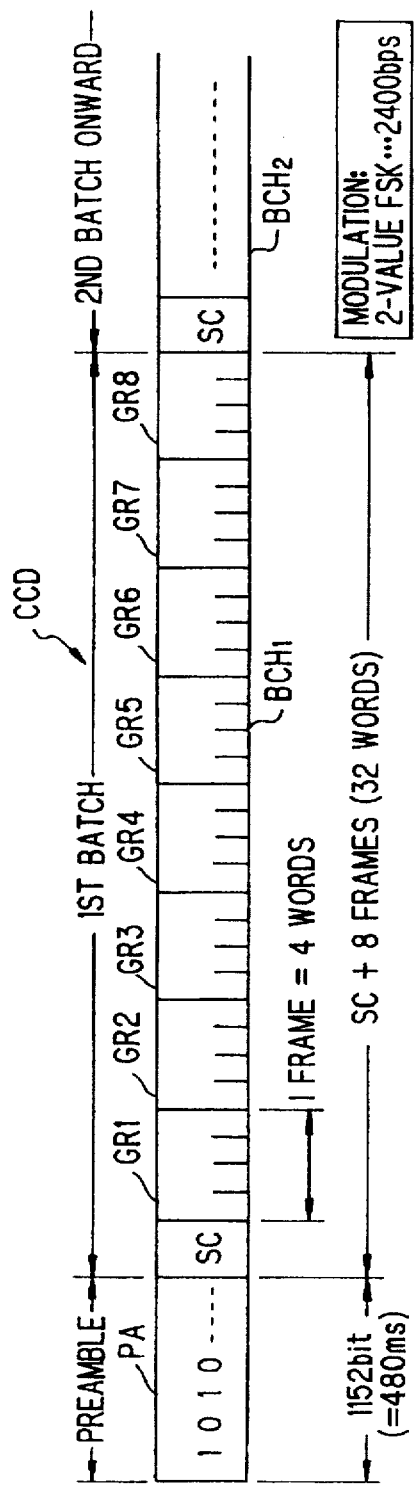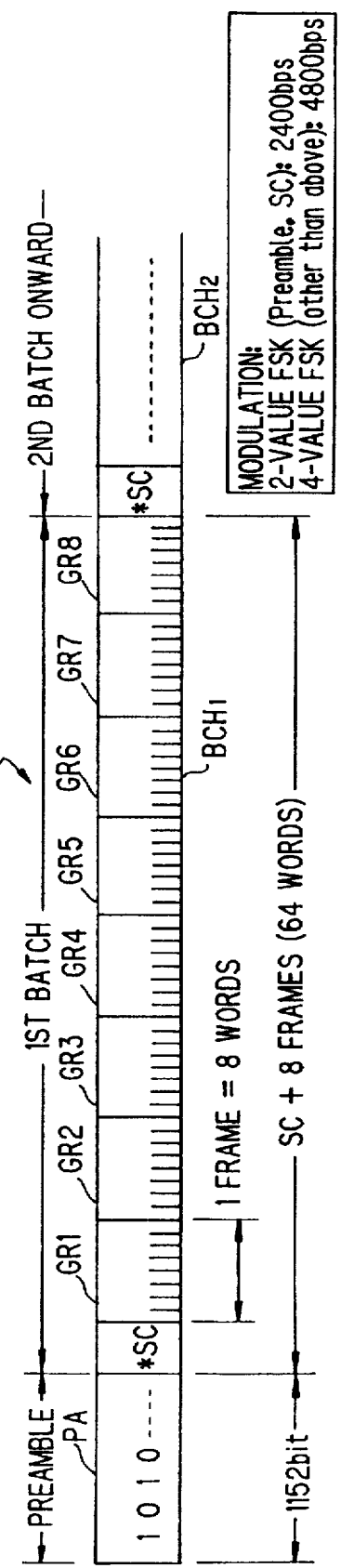

CODE TRANSMISSION SYSTEM AND PORTABLE PAGER IN RADIO PAGING SYSTEM

BACKGROUND OF THE INVENTION

This invention relates to a code transmission system and portable pager (also referred to as a "pocket pager" in a radio paging system. More particularly, the invention relates to a code transmission system and portable pager in a case where a signal resulting from a plurality of modulation methods is transmitted at a plurality of transmission rates.

Generally a radio paging system is operated in the transmission rate of 512 bps or 1200 bps. A plurality of channels are provided by changing frequency for each transmission rate and a subscriber is assigned to any of the plurality of channels.

FIG. 26 is a diagram showing the configuration of such a paging system. The system includes telephones $1a$~$1n$, a public switching telephone network (PSTN) 2, and a call control station 3 for accepting calls to each pocket pager and sending the accepted calls to all base stations at prescribed time intervals (every 30 seconds to every minute). Ten to twenty of the base stations, shown at $4a$ through $4m$, are provided in each prefecture (prefectural district) and transmit data via radio waves at a high power of 250 W. One base station covers a zone having a radius of 5~10 Km. These zones are indicated at $5a$~$5m$. Further, each of the base stations $4a$~$4m$ outputs radio waves at the same frequency in the same prefectural district. The system further includes pocket pagers $6a_1$, $6a_i$, ... $6m_1$, $6m_j$ ... each of which is tuned to the transmission frequency that conforms to the prefectural district in which it is located. As a result, each pocket pager receives radio waves from a base station and issues a ringing tone when it is being called. The pocket pager may be designed to display a message on a liquid-crystal display while issuing the ringing tone.

By way of example, in a case where the pocket pager $6a_1$ is called from the subscriber telephone $1a$, the telephone number of the call control station 3 is dialed, whereby the telephone $1a$ and call control station 3 are interconnected via the public switching telephone network 2. An announcing device incorporated within the call control station 3 informs the calling party of the pocket pager call procedure by a recorded voice track, and the calling party enters the number of the pocket pager in accordance with the procedure. By using an internally provided subscriber memory, the call control station 3 identifies the transmission rate conforming to the pocket pager number and the form of the pocket pager output [T/O (tone only pager, namely a ringing tone output only), NP (numeric pager, namely a message display output using numerals), and IP (information pager, namely a message display using Alphabet or Chinese characters or kanji]. The call control station 3 assembles the signal shown in FIG. 27 from the accepted calls and sends the signal to all of the base stations $4a$~$4m$ in the prefectural district at one time. This is performed at prescribed time intervals (every 30 seconds to every minute). In FIG. 27, PA represents a preamble used to identify the beginning of the signal and to adjust the timing at which data is read. $BCH_1$~$BCH_{40}$ represent batches. Each batch is composed of a 32-bit synchronizing signal (synchronizing code word) SCW and eight groups $GR_1$~$GR_8$. Two groups construct one call signal. One group is constituted by two words (32 bits/ word). Accordingly, a call signal is composed of four words, one word of which is used as an address and the other three words of which are used as a message.

Each of the base stations $4a$~$4m$ enters data into an FSK (frequency shift keying) modulator at a baud rate of 256 Hz with regard to a call at a transmission rate of 512 bps, and the FSK modulator raises and lowers the nominal frequency (e.g., 280.01 MHz) by 5 KHz on the basis of data "0", "1" to execute two-value modulation and sends the modulated signal to the pocket pagers. With regard to a call at a transmission rate of 1200 bps, each base station enters data into the FSK modulator at a baud rate of 600 Hz, and the FSK modulator raises and lowers the nominal frequency by 5 KHz on the basis of data "0", "1" to execute two-value modulation and sends the modulated signal to the pocket pagers. Each of the pocket pagers $6a_1$, $6a_i$, ... $6m_1$, $6m_j$ ... issues a ringing tone to notify its possessor, and may display a message on a liquid-crystal display, if the address contained in the call signal agrees with its own address (stored an internal ROM of the pocket pager), which has been set in advance.

In a case where the possessor of pocket pager $6a_1$, for example, has moved into another prefectural district (i.e., from a first prefectural district to a second prefectural district), as shown in FIG. 28, the pocket pager number and the prefectural district which is the destination are entered into the call control station 3 from a telephone or the like so as to be registered in a subscriber memory $3a$, and the tuning frequency of the pocket pager $6a_1$ is tuned to the transmission frequency of the second prefectural district. When a call is placed from a telephone in the first prefectural district to the pocket pager $6a_1$ under these conditions, the call control station 3 obtains the destination prefectural district from the subscriber memory $3a$ and transfers the number of the pocket pager $6a_1$ to the call control station 3' of this prefectural district. The call control station 3' assembles the signal shown in FIG. 27 from the accepted calls and sends the signal to all of the base stations $4a'$ ... in this prefectural district at one time. This is performed at prescribed time intervals (every 30 seconds to every minute). Each of the base stations $4a'$ performs two-value modulation by FSK modulation at a frequency of 256 Hz with regard to a call at a transmission rate of 512 bps and sends the modulated signal to the pocket pagers. With regard to a call at a transmission rate of 1200 bps, each base station performs two-value modulation by FSK modulation at a frequency of 600 Hz and sends the modulated signal to the pocket pagers. The pocket pagers $6a_1$ issues a ringing tone to notify its possessor, and may display a message on a liquid-crystal display, if the address contained in the call signal agrees with its own address.

The proliferation of radio paging systems has been accompanied by improved service and signal transmission at high rates of 2400 bps and 4800 bps, etc., is now under consideration.

A service is considered in which an exchange of call signals is performed between prefectures in order that a call may be made from one prefecture into another. For example, assume that a subscriber who receives paging service at 4800 bps in one district (Area-1) wishes to receive service in another district (Area-2) as well. If paging service is available in Area-2 Prefecture only at the rate of 2400 bps, the call from Area-1 is transmitted upon having its transmission rate converted to 2400 bps. Consequently, if, say, the base station performs transmission upon applying four-value modulation in a case where the transmission rate is 4800 bps and two-value modulation in a case where the transmission rate is 2400 bps, it becomes necessary for the pocket pager to be designed so as to be capable of reception at both 4800 bps under four-value modulation and 2400 bps under two-value modulation.

In preparation for diversification of these services, there is a need to make a transition from the conventional system, in which the radio frequency and transmission rate are fixed, to a system (as well as the system receivers, namely the pocket pagers) in which radio frequencies and transmission rate are combined at will.

Further, it is essential that a pocket pager be small in size and consume little electric power. In a pocket pager capable of reception using a plurality of modulation methods and a plurality of transmission rates, it is required that a plurality of data demodulating circuits (clock extraction circuits, data discrimination circuits, preamble detection circuits, synchronizing code word detection circuits, etc.) be provided. This is an impediment to a reduction in size and power consumption and makes it difficult to realize the above-mentioned receiver.

SUMMARY OF THE INVENTION

Accordingly, a first object of the present invention is to provide a code transmission system and a portable pager in a radio paging system in which signals of a plurality of types sent in a prescribed combination of modulation methods and transmission rates can be received, and in which it is possible to realize a reduction in size and power consumption.

A second object of the present invention is to provide a code transmission system and a portable pager in a radio paging system in which the effectiveness of reducing power consumption by intermittent reception can be improved irrespective of transmission rate.

A third object of the present invention is to provide a code transmission system and a portable pager in a radio paging system in which data can be received correctly upon identifying the modulation method and transmission rate of a received signal.

A fourth object of the present invention is to provide a code transmission system in a radio paging system in which, in a case where information having a plurality of different transmission rates is transmitted by time division, the length of time for transmission of information at each transmission rate is decided on the basis of pager call traffic at each transmission rate, thereby making it possible to use radio communication efficiently.

According to the present invention, the first object is attained by providing a code transmission system in a radio paging network in which a code comprising a preamble and a plurality of batches, in which one batch is constituted by a synchronizing signal and one or more call-data, is transmitted from a base station to portable pagers each of which notifies its possessor of a call if an address contained in a call-data agrees with its own address, characterized in that in a case where the code is transmitted at a first transmission rate, the base station modulates the entirety of the preamble, the synchronizing signal and the call-data in the code by n values (where n is an even number) and transmits them at the first transmission rate; in a case where the code is transmitted at a second transmission rate that is double the first transmission rate, the base station modulates the preamble and the synchronizing signal in the code by the n values, transmits them at the first transmission rate, modulates the call-data by (n+2 m) values (where m is a natural number) and transmits it at the second transmission rate; and each portable pager performs detection of the preamble and synchronizing signal on the basis of the fact that modulation is by the n values and transmission rate is the first transmission rate, and receives the ensuing call-data based upon this detection.

Further, the first object is attained by providing a portable pager in a radio paging system in which the portable pager receives a code comprising a preamble and a plurality of batches, in which one batch is constituted by a synchronizing signal and one or more call-datas, and notifies its possessor of a call if an address contained in a call-data agrees with its own address, which has been set in advance, the portable pager comprising a receiver for receiving and demodulating the code sent from the base station; a detector for detecting the preamble and synchronizing signal transmitted under modulation by n values (where n is an even number) and at the first transmission rate; a decision unit for determining, on the basis of whether a synchronizing signal has "1", "0" logic that is the inverse of that of the original synchronizing signal, whether a call-data has been modulated by the n values and transmitted at the first transmission rate or modulated by (n+2 m) values (where m is a natural number) and transmitted at a second transmission rate that is double the first transmission rate; an n-value demodulator for demodulating an n-value modulated signal to "1", "0" data; an (n+2 m) demodulator for demodulating an (n+2 m)-modulated signal to "11", "10", "01", "00" data; and means for accepting a call-data via the n-value demodulator if result of the determination is that the call-data has been modulated by the n values and via the (n+2 m) demodulator if result of the determination is that the call-data has been modulated by the (n+2 m) values.

In accordance with the present invention, the second object is attained by operating a receiver for a prescribed time at a prescribed period to intermittently monitor whether the preamble has been detected and, if the preamble has been detected, continuing operation of the receiver and starting operation of a synchronizing detector and other logic circuitry.

In order to attain the third object of the present invention, it is so arranged that if the code is transmitted from the base station at the second transmission rate, the "1", "0" logic of the synchronizing signal which prevails in a case where the code is transmitted at the first transmission rate is inverted and transmitted as the synchronizing signal, and if the logically inverted synchronizing signal is detected in a portable pager, the call-data is demodulated by the (n+2 m) values, whereas if the logically non-inverted synchronizing signal is detected, the call-data is demodulated by the n values.

In order to attain the fourth object of the present invention, it is so arranged that if codes of a plurality of transmission rates are transmitted by time division on a single radio frequency channel, length of time for transmission of information at each transmission rate is decided on the basis of pager call traffic at each transmission rate.

Other features and advantages of the present invention will be apparent from the following description taken in conjunction with the accompanying drawings.

BRIEF DESCRIPTION OF THE DRAWINGS

FIGS. 3A and 3B are diagrams showing the structures of codes;

FIG. 5 is a diagram for describing two-value FSK modulation;

FIG. 6 is a block diagram illustrating a two-value FSK demodulating circuit;

FIG. 7 is a diagram for describing four-value FSK modulation;

FIG. 8 is a block diagram illustrating a four-value FSK demodulating circuit;

FIGS. 20A and 20B are diagrams showing the structures of codes according to a second embodiment;

DESCRIPTION OF THE PREFERRED EMBODIMENTS (A) Overview of the invention

Figure 1:
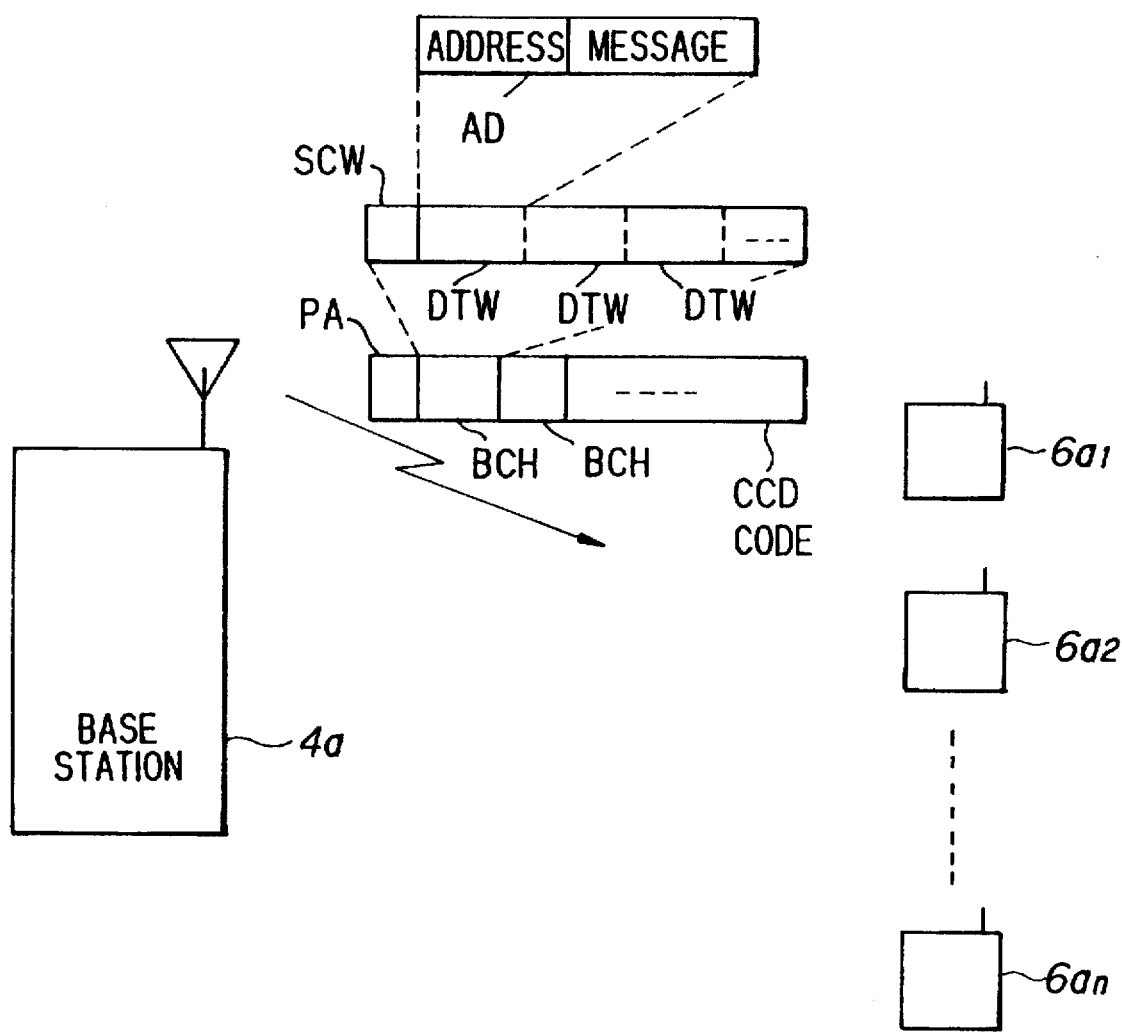
FIG. 1 is a diagram for describing the principles of the present invention.

FIG. 1 is a diagram for describing the principles of the present invention.

Numeral 4a denotes a base station for transmitting a code CCD comprising a preamble PA and a plurality of batches BCH, in which each batch BCH is constituted by a synchronizing code word SCW and one or more call-data code words DTW. Numerals $6a_1 \sim 6a_n$ denote pocket pagers for receiving the code CCD transmitted from a base station. When an address AD contained in a call-data code word DTW agrees with its own address, a pager notifies its possessor of the call.

In a case where the call-data code word DTW is transmitted at a first transmission rate $V_{2400}$ (bps), the base station 4a modulates the entirety of the code CCD, namely the preamble PA, the synchronizing code word SCW and the call-data code word DTW, by n values (where n is an even number, e.g., n=2) and transmits them at the first transmission rate $V_{2400}$ (bps). In a case where the code is transmitted at a second transmission rate $V_{4800}$ (bps) that is double the first transmission rate $V_{2400}$ (bps), the base station 4a modulates the preamble PA and the synchronizing code word SCW in the code CCD by the two values, transmits them at the first transmission rate $V_{2400}$ (bps), modulates the call-data code word DTW by (n+2 m) values (where m is a natural number, e.g., m=1, n+2 m=4) and transmits them at the second transmission rate $V_{4800}$ (bps). Thus, regardless of whether the transmission rate is the first transmission rate $V_{2400}$ (bps) or the second transmission rate $V_{4800}$ (bps), which is double the first, the preamble PA and the synchronizing code word SCW are modulated by the n (=2) values and transmitted to the pagers at the first transmission rate $V_{2400}$ (bps). Therefore, each of the pagers $6a_1 \sim 6a_n$ detects the preamble PA and the synchronizing code word SCW at detectors of just one kind and receives the call-data code word DTW, which follows the synchronizing code word, on the basis of the results of detection. More specifically, the call-data code word DTW is demodulated by the n (=2) values when the transmission rate is the first transmission rate $V_{2400}$ (bps) and at the (n+2 m) (=4) values when the transmission rate is the second transmission rate $V_{4800}$ (bps).

Thus, regardless of whether the transmission rate is the first transmission rate $V_{2400}$ (bps) or the second transmission rate $V_{4800}$ (bps), which is double the first, the preamble PA and the synchronizing code word SCW are modulated by n (=2) values and transmitted to the pagers at the first transmission rate $V_{2400}$ (bps). This means that it suffices to provide the pager with a single common preamble detector, a single common synchronizing code word detector and a single common clock extraction unit, etc. This makes it possible to reduce the size of the pager as well as the amount of power consumed. Moreover, it is possible to receive signals of a plurality of types sent in a prescribed combination of modulation method and transmission rate.

Further, when the code is transmitted at the second transmission rate $V_{4800}$ (bps), the base station 4a inverts the "1", "0" logic of the synchronizing code word which prevails when the code is transmitted at the first transmission rate $V_{2400}$ (bps) and transmits the logically inverted synchronizing code word as the synchronizing code word. If the logically inverted synchronizing code word is detected by the synchronizing code word detector in each of the pagers $6a_1 \sim 6a_n$, the pager demodulates the call-data code word DTW by (n+2 m) (=4) values. If the original (non-inverted) synchronizing code word is detected, the pager demodulates the call-data code word by n (=2) values. If this arrangement is adopted, the modulation method and the transmission rate of the received code are identified and the data can be received correctly.

Furthermore, the base station 4a transmits the code upon making the length of the preamble fixed irrespective of the transmission rate or upon making the ratio of the length of the preamble to the length of the call-data code word fixed irrespective of the transmission rate. If this expedient is adopted, the effectiveness of reducing power consumption by intermittent reception can be improved irrespective of the transmission rate.

In a case where information having a plurality of different transmission rates is transmitted by time division, the length of time for transmission of information at each transmission rate is decided on the basis of pager call traffic at each transmission rate, thereby making it possible to use radio communication efficiently.

(B) First embodiment of the invention (a) Configuration of radio paging system

Figure 2:
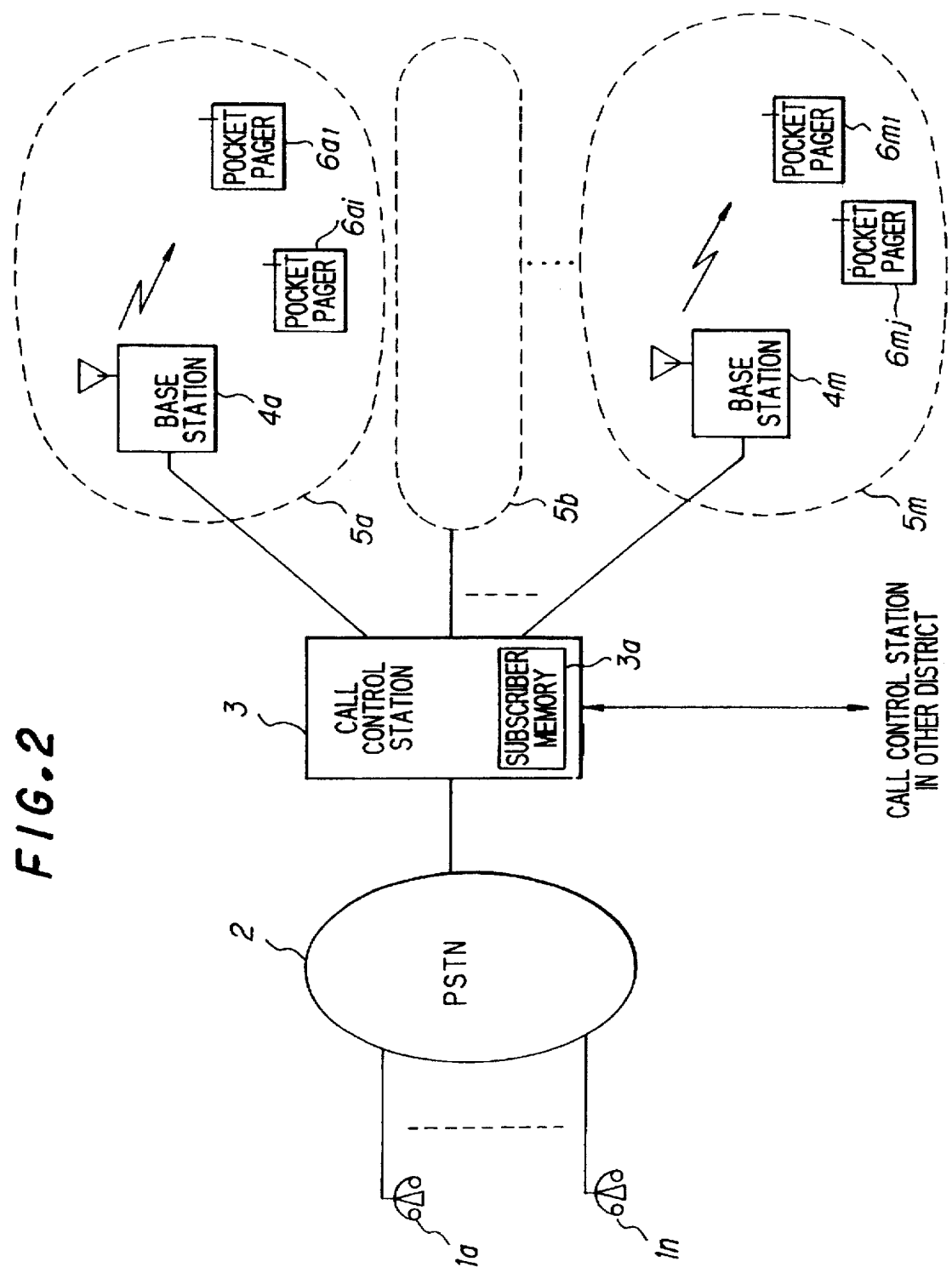
FIG. 2 is a diagram showing the configuration of a radio paging system.
Figure 26:
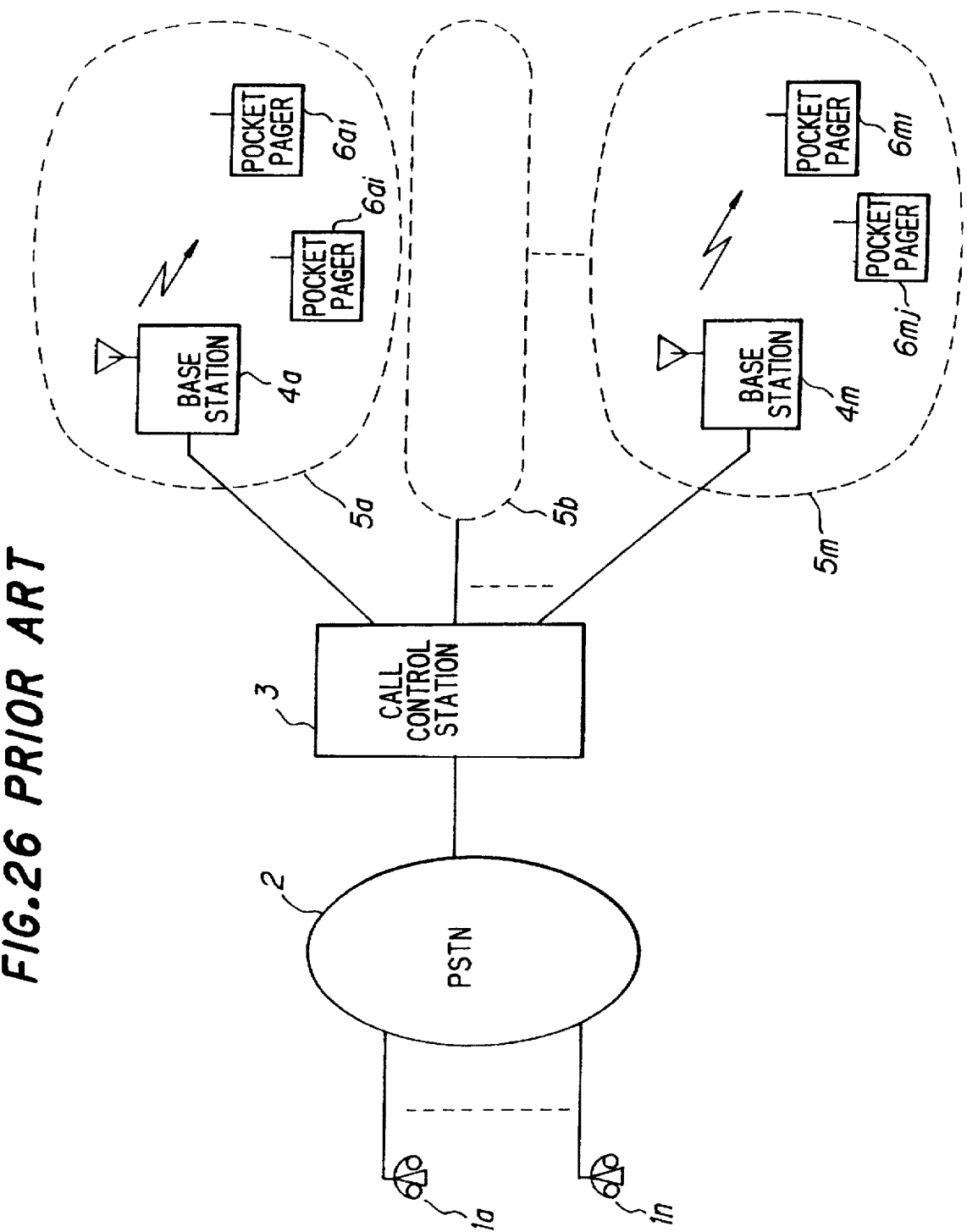
FIG. 26 is a diagram showing a radio paging system according to the prior art.

FIG. 26 is a diagram showing the configuration of a paging system according to the present invention. Components in FIG. 2 identical with those of the system shown in FIG. 26 are designated by like reference characters. The system includes the telephones $1a$~$1n$, the public switching telephone network (PSTN) 2, and the call control station 3 for accepting calls to each pocket pager and sending the accepted calls to all base stations at prescribed time intervals. Ten to twenty of the base stations at $4a$ through $4m$ are provided in each prefecture, and one base station covers a zone having a radius of 5~10 Km. These zones are indicated at $5a$~$5m$. The system further includes the pocket pagers $6a_1$, $6a_i$, ... $6m_1$, $6m_j$ ... The call control station 3 is provided with a subscriber memory $3a$ in which prescribed information is stored in correspondence with the number of each pocket pager.

At prescribed intervals the call control station 3 assembles calls accepted during this time into the codes shown in FIGS. 3A, 3B and simultaneously sends the particular code to all of the base stations $4a$~$4m$ in this prefectural district at one time. More specifically, in a service region (prefectural district) where the transmission rate is 2400 bps, the call control station 3 is set before so as to create a code (FIG. 3A) that conforms to this transmission rate and sends the code to each base station. Similarly, in a service region (prefectural district) where the transmission rate is 4800 bps, the call control station 3 is set before so as to create a code (FIG. 3B) that conforms to this transmission rate and sends the code to each base station. Further, in a case where transfer to another prefectural district has been instructed, the call control station 3 is so designed as to transfer the number of the pocket pager to the call control station in the other prefectural district.

(b) Code structure

Figure 27:
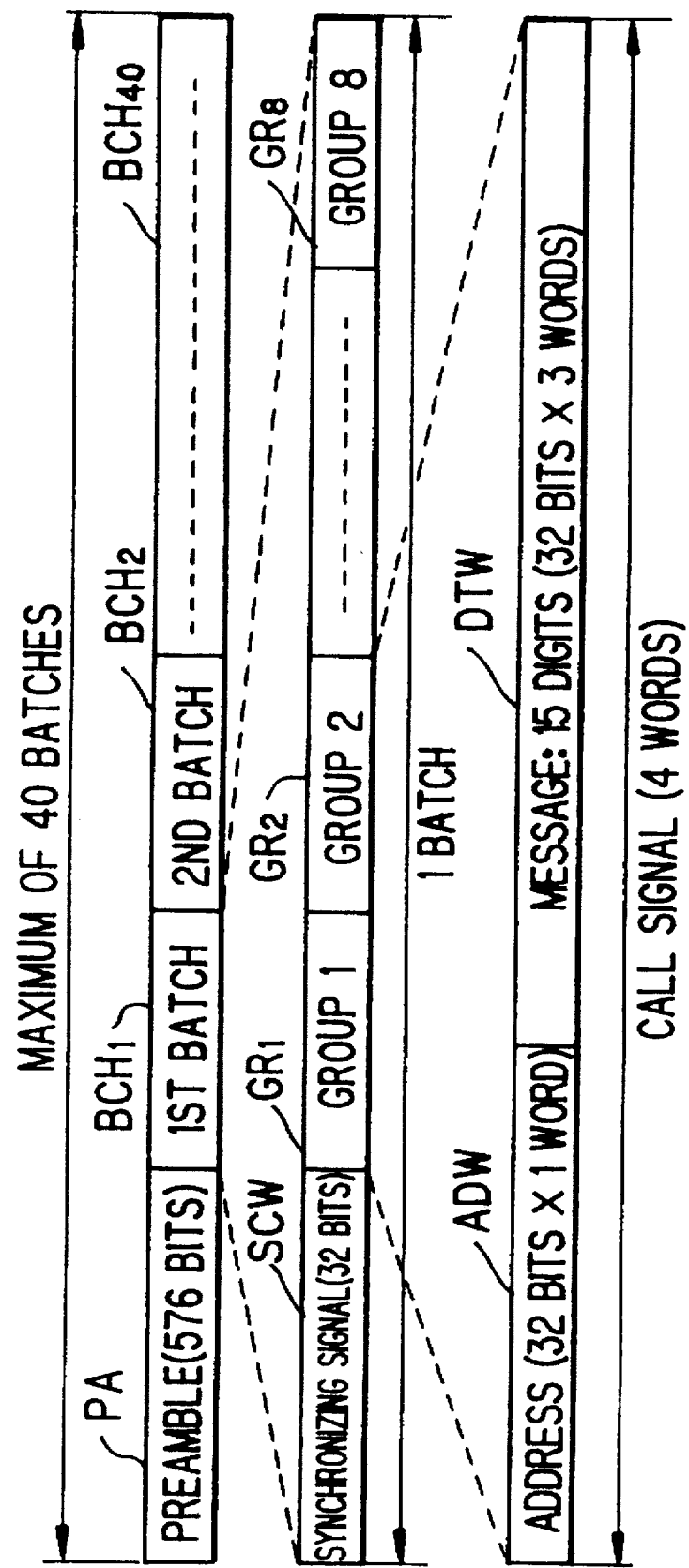
FIG. 27 is an example of signal constitution according to the prior art.
Figure 28:
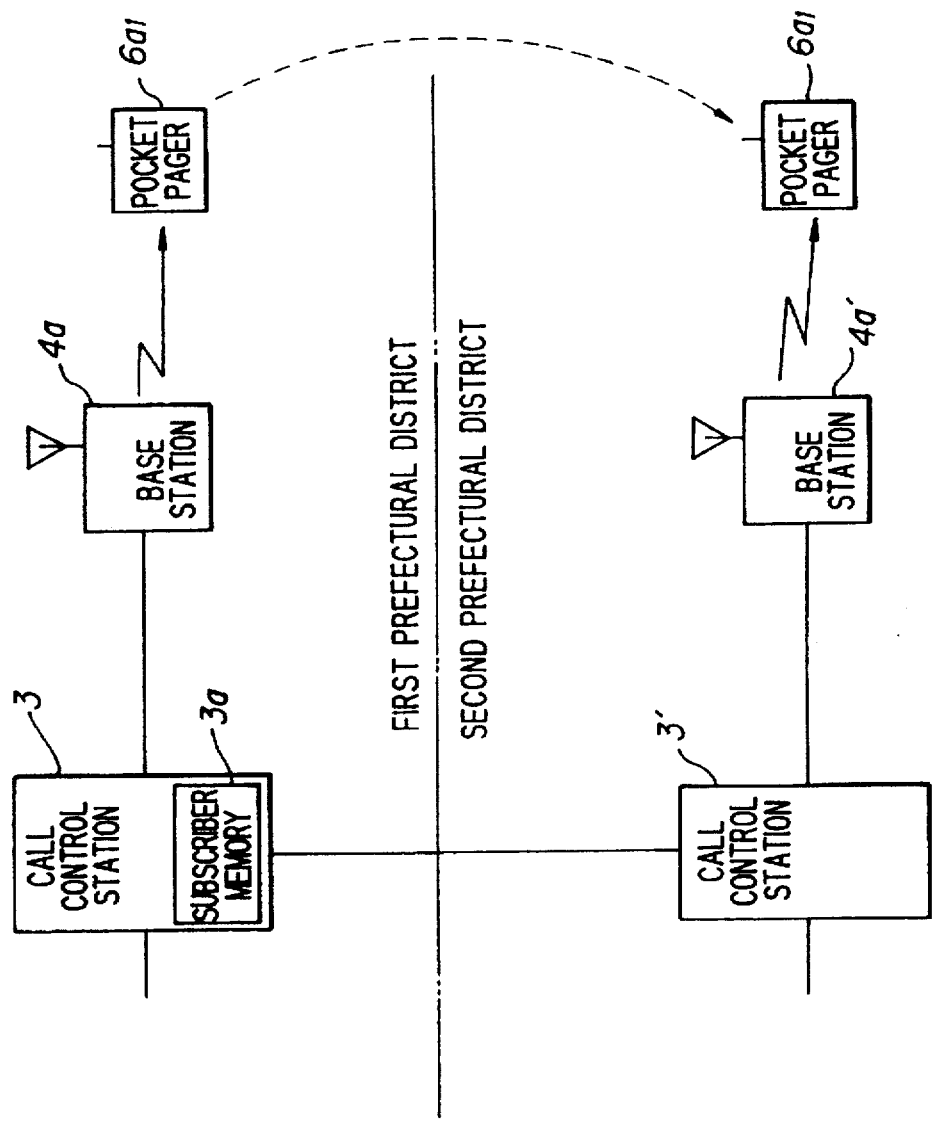
FIG. 28 is a diagram for describing a call transfer when a pager moves from one prefectural district to another.

FIGS. 3A and 3B are diagrams useful in describing the structure of such codes as well as the transmission rate. FIG. 3A shows the structure of a code in a case where modulation is performed by two-value FSK and transmission at a rate of 2400 bps, and FIG. 3B shows the structure of a code in a case where modulation is performed by four-value FSK and transmission at a rate of 4800 bps. Each code basically has the POCSAG structure shown in FIG. 27 and is composed of a preamble PA and a plurality, or 40 in this example, of batches $BCH_1$~$BCH_{40}$. Each batch is composed of a 32-bit synchronizing signal (a synchronizing code word SC or inverted synchronizing code word *SC) and eight groups (frames) $GR_1$~$GR_8$.

It is so arranged that two-value FSK 2400 bps data and four-value FSK 4800 bps data can be distinguished from each other. Specifically, in a case where a code is transmitted at the transmission rate of 4800 bps, the "1", "0" logic of its synchronizing code word is transmitted upon being made the inverse of the "1", "0" logic of the synchronizing code word prevailing in the case where the code is transmitted at the transmission rate of 2400 bps. One group is constituted by four words (32 bits/word) in case of two-value FSK (2400 bps) and by eight words (32 bits/word) in case of four-value FSK (4800 bps). In the case of two-value FSK (1200 bps) of FIG. 27, one group is composed of two words (32 bits/word).

One call signal is constructed by two groups. In the case of the transmission rate of 2400 bps, therefore, one call signal is composed of eight words because one group is constituted by four words, as described earlier. One of the eight words is the address and the remaining seven words form a message. Accordingly, more than twice as much message can be transmitted at 2400 bps than at 1200 bps. In the case of transmission at 4800 bps, on the other hand, one group is composed of eight words and therefore one call signal is constituted by 16 words, one of which is the address and the others of which form a message. Accordingly, an even longer message can be transmitted at 4800 bps, thus making improved service possible.

At the transmission rate of 2400 bps, all bits constructing the code undergo two-value FSK modulation and are transmitted at the rate of 2400 bps. In the case where the transmission rate is 4800 bps, the preamble PA and the inverted synchronizing code word *SC contained in the code are FSK-modulated by two values and transmitted at the transmission rate of 2400 bps, but the rest of the code, namely the call-data code word (groups), is modulated by four values and transmitted at the transmission rate of 4800 bps.

(c) Wireless base station

Upon receiving the code of FIG. 3A or 3B from the call control station 3, the base stations $4a$~$4m$ subject the code to FSK modulation and then transmit the code. More specifically, in a district where the transmission rate is 2400 bps, each base station receives the code shown in FIG. 3A and the "1", "0" logic of all bits constituting the code enters an FSK modulator at 1200 Hz. The FSK modulator raises and lowers the nominal frequency of 280.01 MHz by 5 KHz on the basis of the "0", "1" logic to execute two-value modulation and sends the modulated signal to the pocket pagers. In a district where the transmission rate is 4800 bps, each base station receives the code shown in FIG. 3B, modulates the preamble PA and the inverted synchronizing code word *SC in the code by two values and transmits the results at the transmission rate of 4800 bps. The rest of the code, namely the call-data code word (groups), is modulated by four values and transmitted at the transmission rate of 4800 bps.

Figure 4:
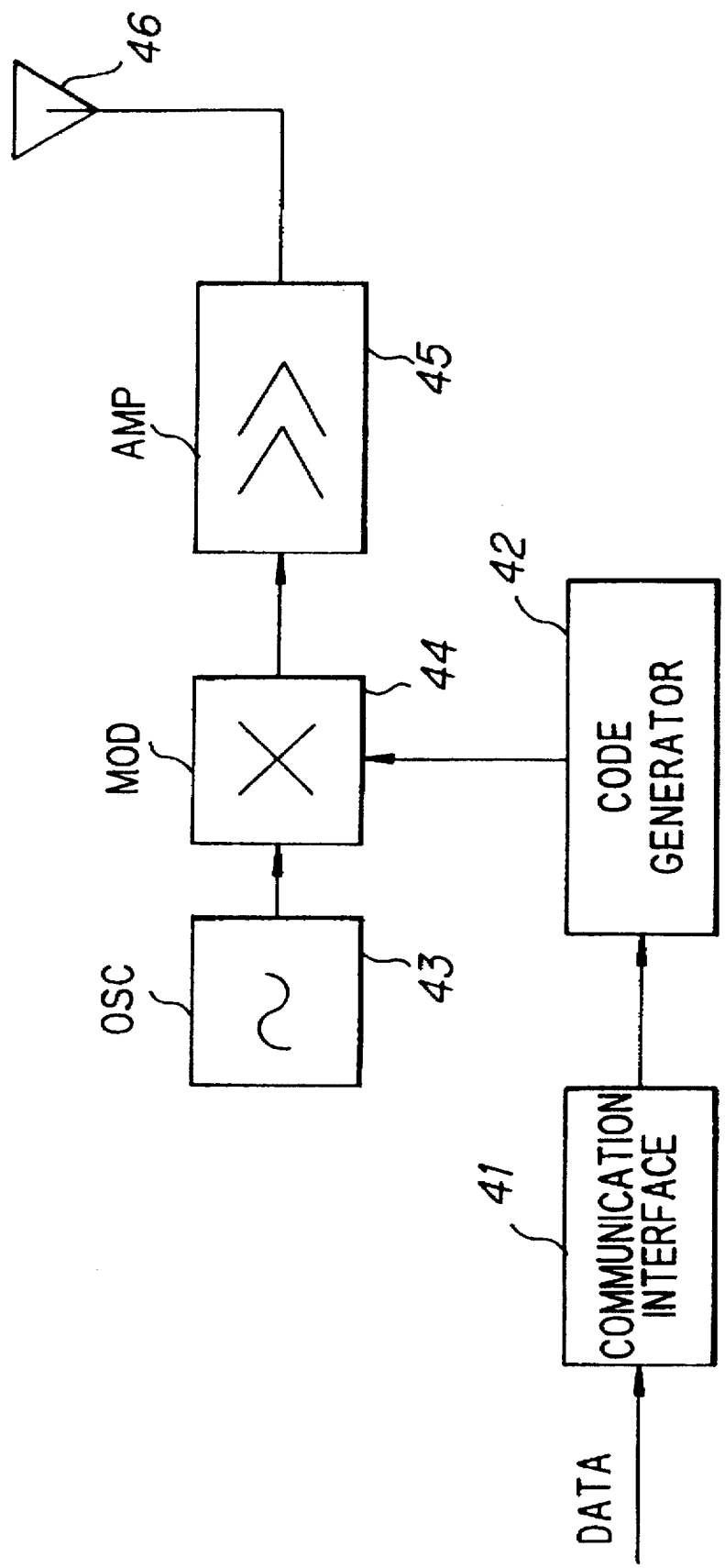
FIG. 4 is a block diagram illustrating a base station.

FIG. 4 is a block diagram showing the construction of a base station. The base station includes a communication interface 41 which functions to receive and buffer the code (of FIG. 3A or 3B) sent from the call control station 3, a code generator 42, an oscillator 43 for outputting a high-frequency signal of a nominal frequency fc designated for the prefectural district in which the base station is located, an FSK modulator 44, a transmitter 45 having an internally provided high-frequency amplifier and the like, and an antenna 46.

In a district where the transmission rate is 2400 bps, the code generator 42 supplies the FSK modulator 44 with the data composed of all bits of the received code at a rate of 1200 Hz. The FSK modulator 44 outputs a frequency signal $F_L$, which is 5 KHz lower than the nominal frequency fc, if the input is logical "1" and outputs a frequency signal $F_H$, which is 5 KHz higher than the nominal frequency fc, if the input is logical "0", as illustrated in FIG. 5. The transmitter 45 subjects the signal entering from the FSK modulator 44 to high-frequency amplification a and transmits the amplified signal via the antenna 46. As a result of the foregoing operation, the nominal frequency is transmitted upon being raised and lowered in dependence upon the 1200 Hz "0", "1" logic, and therefore 2400 bps, two-value FSK modulation is achieved.

FIG. 6 is a block diagram showing the construction of a two-value FSK demodulating circuit. The circuit includes an intermediate-frequency amplifier & limiter circuit 62e, a demodulating circuit 62f for outputting a voltage proportional to the amount of shift from the nominal frequency, a low-pass filter 62g for smoothing the output of the demodulating circuit 62f, and a two-value FSK demodulator 62h. The latter has a comparator 62h-1 for comparing the output level of the low-pass filter 62g with a reference level, and a waveform shaping circuit 62h-2 for shaping the waveform of the output signal from the comparator 62h-1 to 2400 bps data in sync with a reproduced clock from a clock reproducing unit (not shown). The 2400 bps data is outputted as DATA.

In the district where the transmission rate is 4800 bps, the code generator 42 converts the "1" logic of the preamble PA and inverted synchronizing code word *SC, which are contained in the received code, to "11", converts the "0" logic to "00", enters the results into the FSK modulator 44 at the rate of 1200 Hz, forms the rest of the code, namely the call-data code word (groups), into sets of two bits each and enters the results into the FSK modulator 44 at the rate of 1200 Hz. As shown in FIG. 7, the FSK modulator 44 delivers an output frequency of F4 when the input data is "00", F3 when the input data is "01", F2 when the input data is "10" and F1 when the input data is "11". The transmitter 45 subjects the signal entering from the FSK modulator 44 to high-frequency amplification and transmits the amplified signal via the antenna. By virtue of this operation, a transmission rate of 2400 bps based upon two-value FSK modulation is substantially achieved with regard to the preamble PA and inverted synchronizing code word *SC. As regards the rest of the data (the call-data code word data), transmission is performed upon applying four-value FSK modulation at two bits of 2400 bps so that a transmission rate of 4800 bps is achieved.

Figures 9, 10:
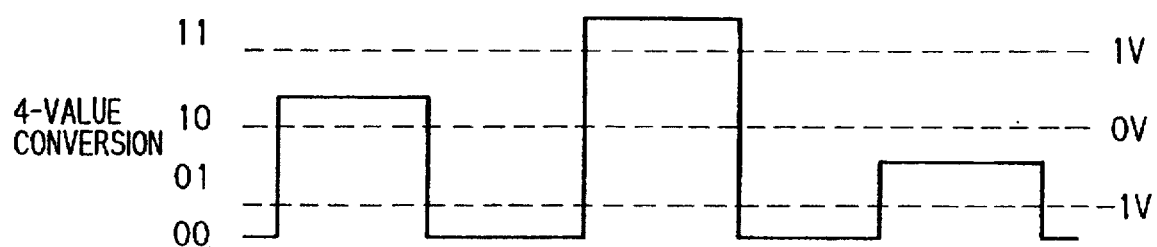
FIG. 9 is a diagram for describing four-value FSK demodulation.
FIG. 10 is a demodulation logic table for four-value FSK demodulation.

FIG. 8 is a block diagram showing the construction of a four-value FSK demodulating circuit. The circuit includes the intermediate-frequency amplifier & limiter circuit 62e, the demodulating circuit 62f for outputting a voltage proportional to the amount of shift from the nominal frequency, the low-pass filter 62g for smoothing the output of the demodulating circuit 62f, and a four-value FSK demodulator 62i. The latter has comparators 62i-1~62i-3 for comparing the output level of the low-pass filter 62g with first, second and third reference levels, respectively, and a four-value/two-value converter 62i-4, to which output signals a, b, c from respective ones of the comparators are applied, for effecting a conversion from four values to two values and shaping the waveform to 4800 bps data in sync with a reproduced clock. The 4800 bps data is outputted as DATA. FIG. 9 is a diagram showing the corresponding relationship between the two-bit data "00", "01", "10", "11" and the output voltage level of the demodulating circuit 62f. The voltage level is less than −1 V for data "00"; in the range −1 to 0 V for data "10"; in the range 0 to 1V for data "10"; and greater than 1 V for data "11". Accordingly, the relationship between the outputs a, b, c from the respective comparators 62i-1, 62i-2, 62i-3 and the logic "00", "01", "10", "11" is as illustrated in FIG. 10.

(d) Pocket pager (d-1) Overall construction

Figure 11:
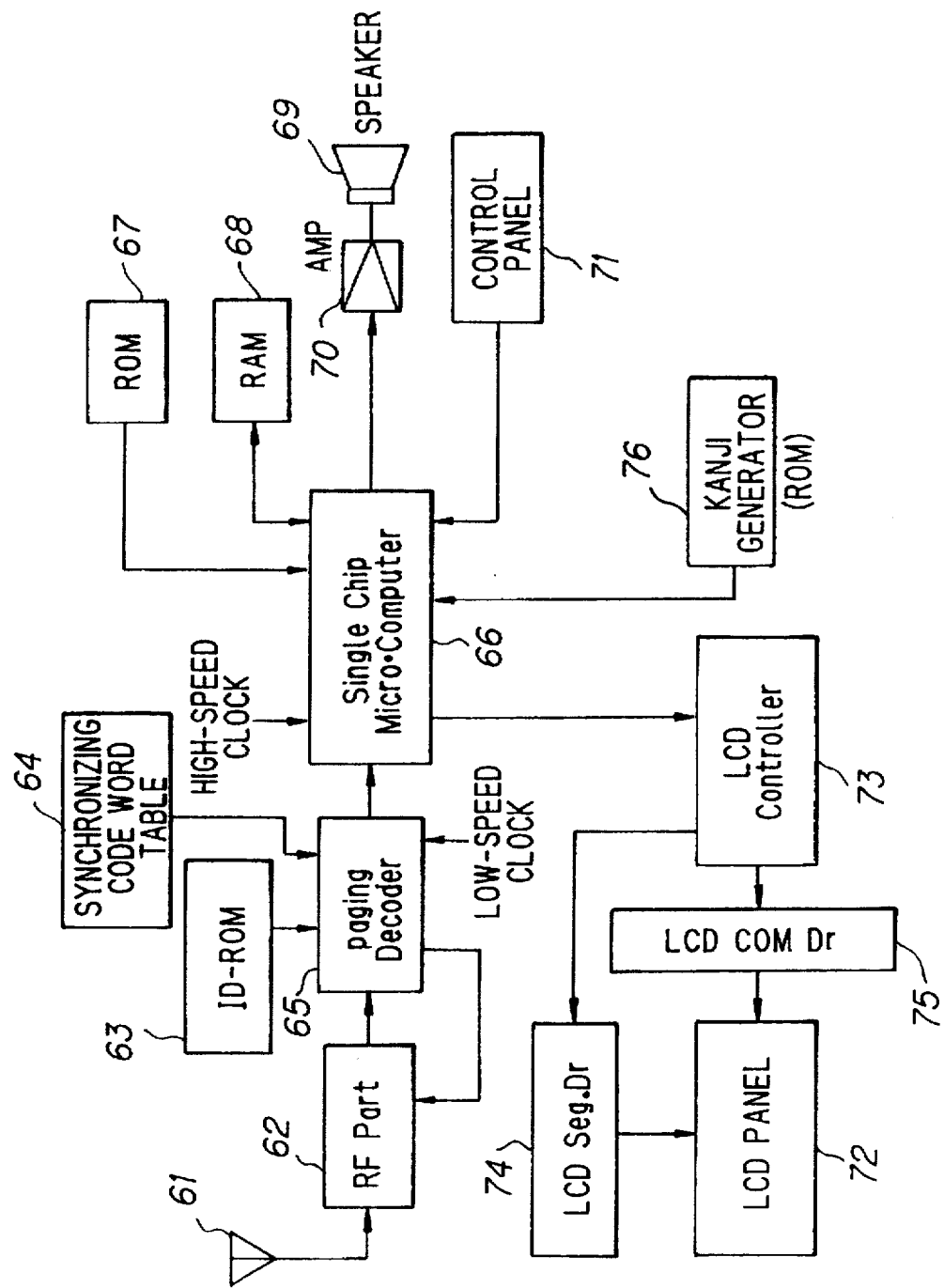
FIG. 11 is a block diagram showing the overall construction of a pocket pager.

FIG. 11 is a block diagram showing the overall construction of the pocket pager. As shown in FIG. 11, the pocket pager includes an antenna 61; an RF part 62; an ID-ROM 63 for storing the address specific to the pager; a synchronizing code word table 64 storing the synchronizing code word SC, which has been attached to the beginning of each batch, as well as inverted synchronizing code word *SC; and a paging decoder 65, which performs monitoring to determine whether an address contained in a received code after detection of the synchronizing code word agrees with the pager's own address. If the two addresses agree, the paging decoder 65 accepts the ensuing message and enters the message into a microcomputer 66. The latter controls the overall pager. The pager further includes a ROM 67; a RAM 68; a speaker 69 for outputting a ringing tone; an amplifier 70 for amplifying the call signal; a control panel 71 provided with various keys; a liquid-crystal display (LCD panel) 72 for displaying a received message; an LCD controller 73; an LCD segment driver 74; an LCD command driver 75; and a character generator 76 for generating kanji patterns.

(d-2) Details of RF part

Figure 12:
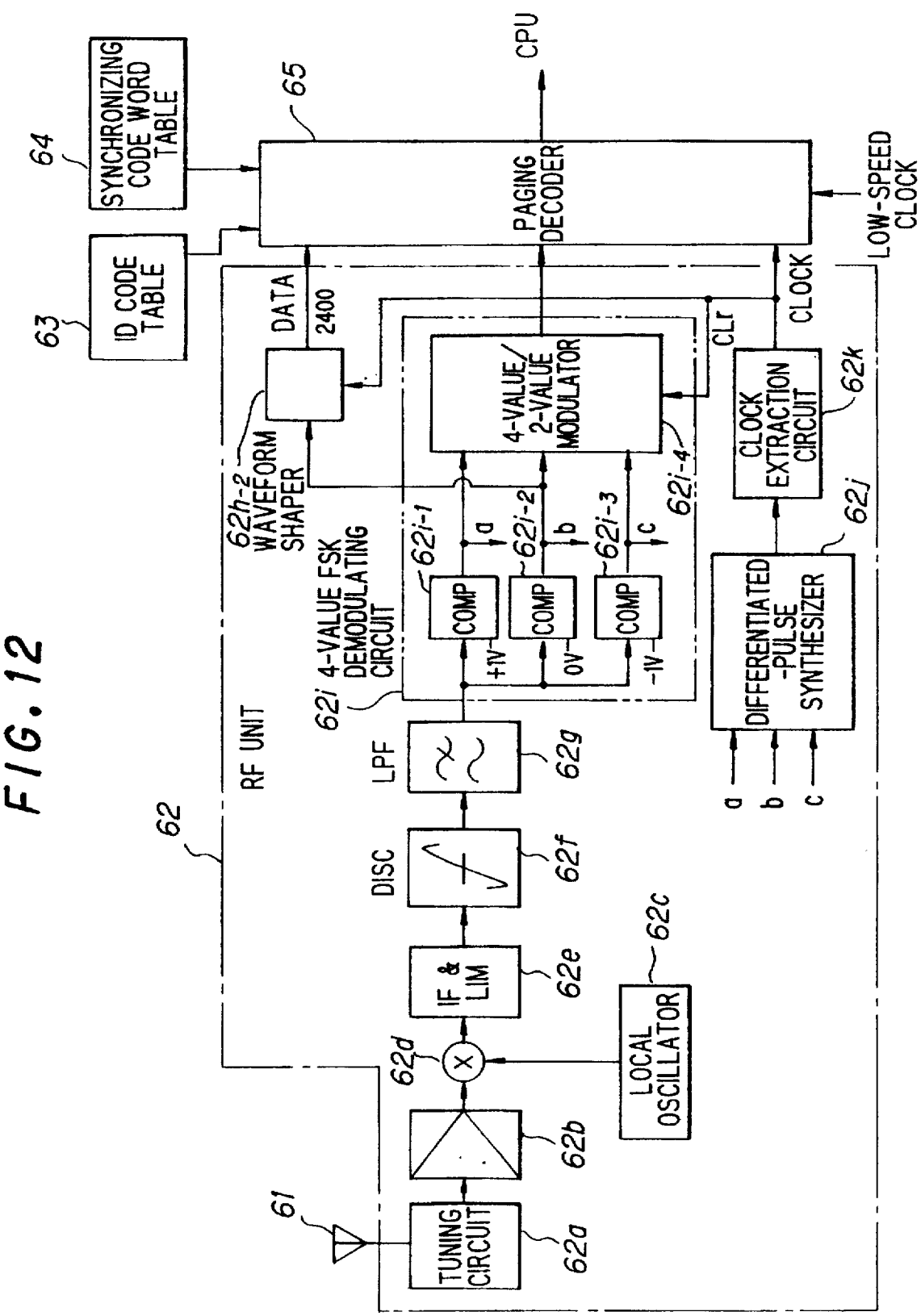
FIG. 12 is a block diagram showing in detail the construction of an RF part of a pocket pager.

FIG. 12 is a block diagram showing in detail the construction of the RF part 62 of the pocket pager. The RF part 62 includes a tuning circuit 62a; a high-frequency amplifier circuit 62b; a local oscillator 62c; a mixer 62d for converting the high-frequency signal from the high-frequency amplifier circuit 62b to a prescribed intermediate-frequency signal (nominal-frequency signal) on the basis of the frequency signal outputted by the local oscillator 62c; the intermediate-frequency amplifier & limiter circuit 62e; the demodulating circuit 62f for outputting a voltage proportional to the amount of shift from the nominal frequency; the low-pass filter 62g for smoothing the output of the demodulating circuit 62f; the waveform shaping circuit 62h-2 for reading and shaping the waveform of the 2400 bps data in sync with a reproduced clock CLr from a clock reproducing unit and then outputting the resulting signal; the four-value FSK demodulator 62i for converting four-value demodulated data to two-values and outputting the two-value data at 4800 bps; a differentiated-pulse synthesizing unit 62j; and a clock extraction circuit 62k.

The four-value FSK demodulating circuit 62i has the comparators 62i-1~62i-3 for comparing the output level of the low-pass filter 62g with the first, second and third reference levels (+1 V, 0 V, −1 V), respectively, and the four-value/two-value converter 62i-4, to which the output signals a, b, c from respective ones of the comparators are applied, for effecting a conversion from four values to two values and shaping the waveform to 4800 bps data in sync with the reproduced clock. As described above in accordance with FIGS. 8 through 10, the four-value FSK demodulating circuit 62i outputs two-bit data "00" when the demodulated output level is less than −1 V; "01" when the demodulated output level ranges from −1 to 0 V, "10" when the demodulated output level ranges from 0 to 1 V; and "11" when the demodulated output level is greater than 1 V. In other words, an output is produced at a rate of 4800 bps.

It should be noted that "1","0" of the preamble and synchronizing signal having the transmission rate of 2400 bps can be identified by monitoring the high "H" and low "L" levels of the output signal b from the second comparator 62i-2.

Figure 13:
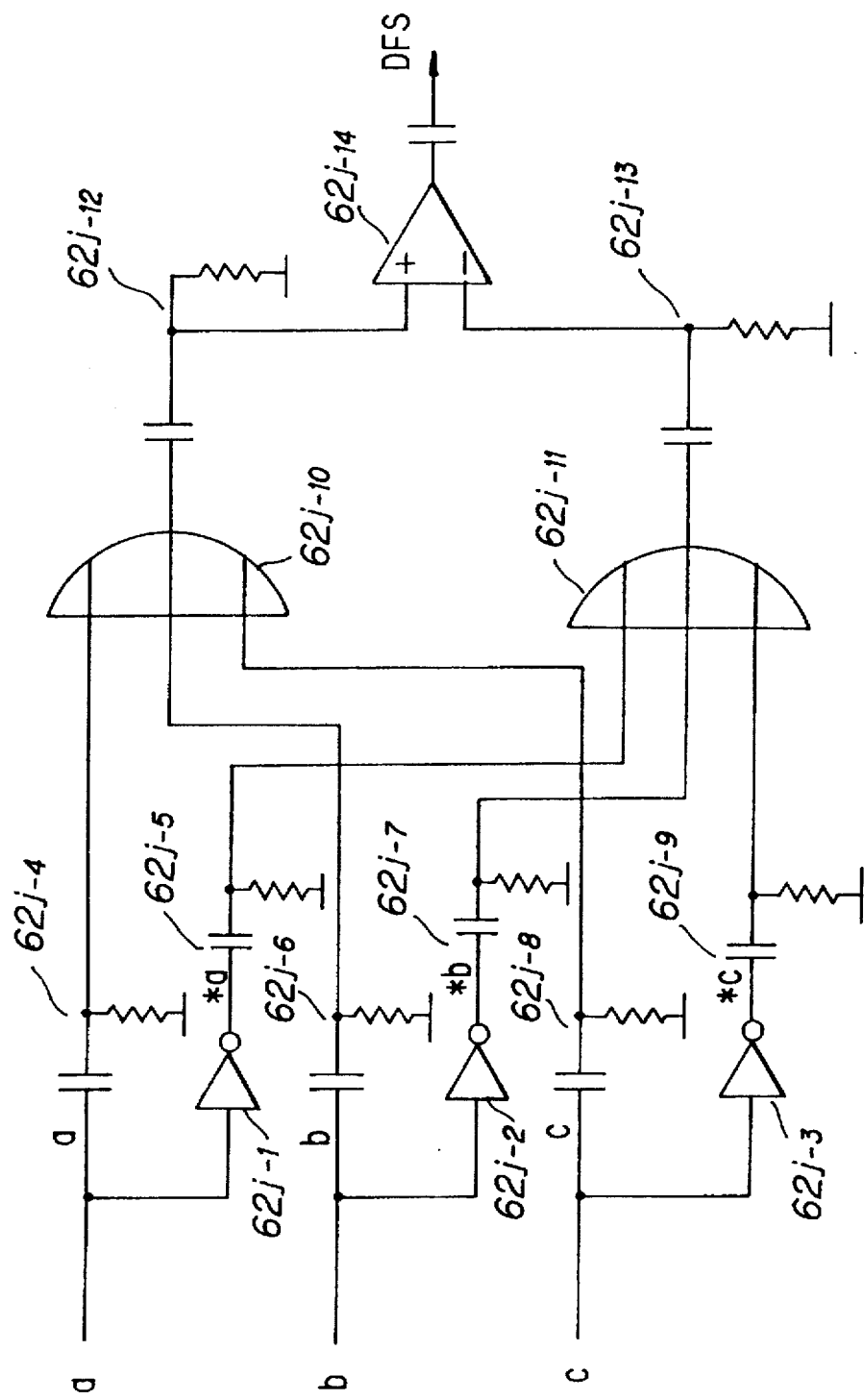
FIG. 13 is a diagram showing the construction of a differentiated-pulse synthesizer.

As shown in FIG. 13, the differentiated-pulse synthesizing unit 62j includes inverters 62j-1, 62j-2, 62j-3 for inverting the outputs a, b, c of the comparators 62i-1, 62i-2, 62i-3, respectively; differentiating circuits 62j-4~62j-9 for differentiating the non-inverted signals a, b, c and inverted signals *a, *b, *c, respectively; an OR gate 62j-10 for combining the outputs of the differentiating circuits 62j-4, 62j-6, 62j-8; an OR gate 62j-11 for combining the outputs of the differentiating circuits 62j-5, 62j-7, 62j-9; differentiating circuits 62j-12, 62j-13 for differentiating the output signals of the OR gates 62j-10, 62j-11; and a comparator amplifier 62j-14, to which the outputs of the differentiating circuits 62j-12, 62j-13 are applied as inputs. The output of the comparator amplifier 62j-14 is a signal DFS.

Figure 14:
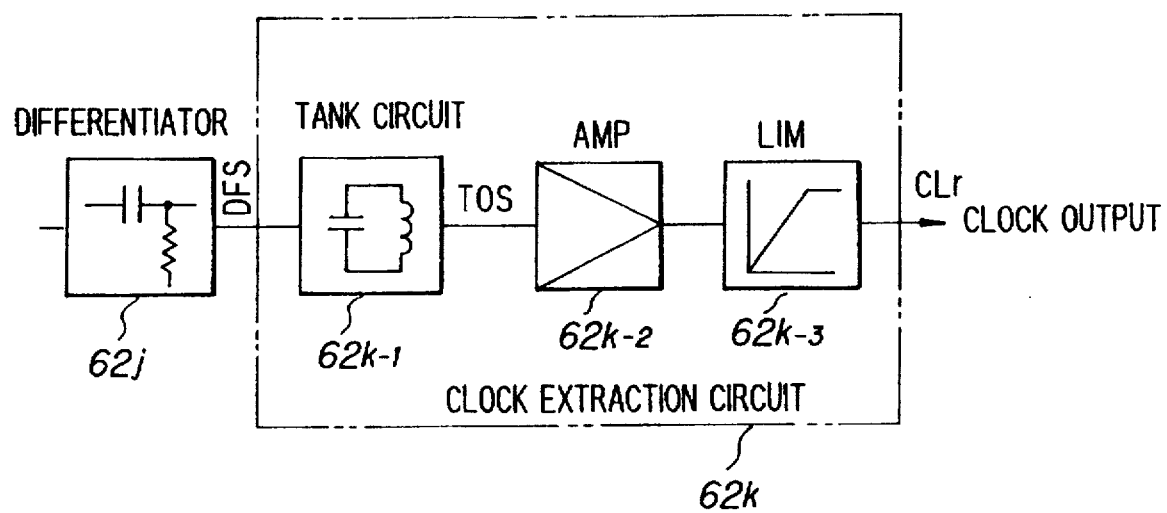
FIG. 14 is a block diagram of a clock extraction circuit.
Figure 15:
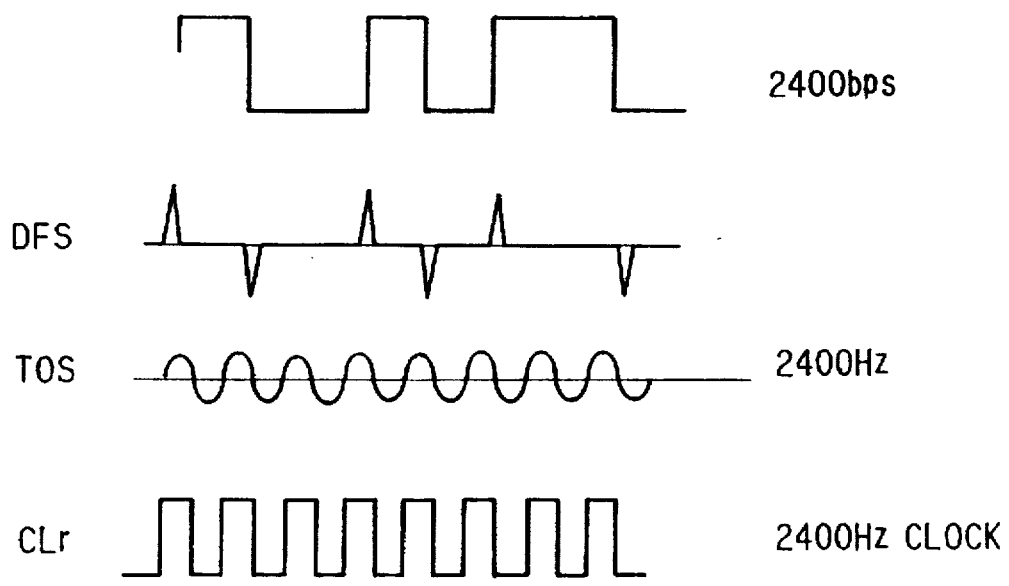
FIG. 15 is a waveform diagram for describing the operation of the clock extraction circuit.

As shown in FIG. 14, the clock extraction circuit 62k includes a tank circuit 62k-1, to which the output signal DFS of the differentiated pulse synthesizer 62j is applied, for outputting a signal TOS which oscillates at a frequency of 2400 Hz; an amplifier circuit 62k-2; and a limiter 62k-3. The limiter 62k-3 produces the reproduced clock CLr, which is shown in FIG. 15.

(d-3) Construction of paging decoder

Figure 16:
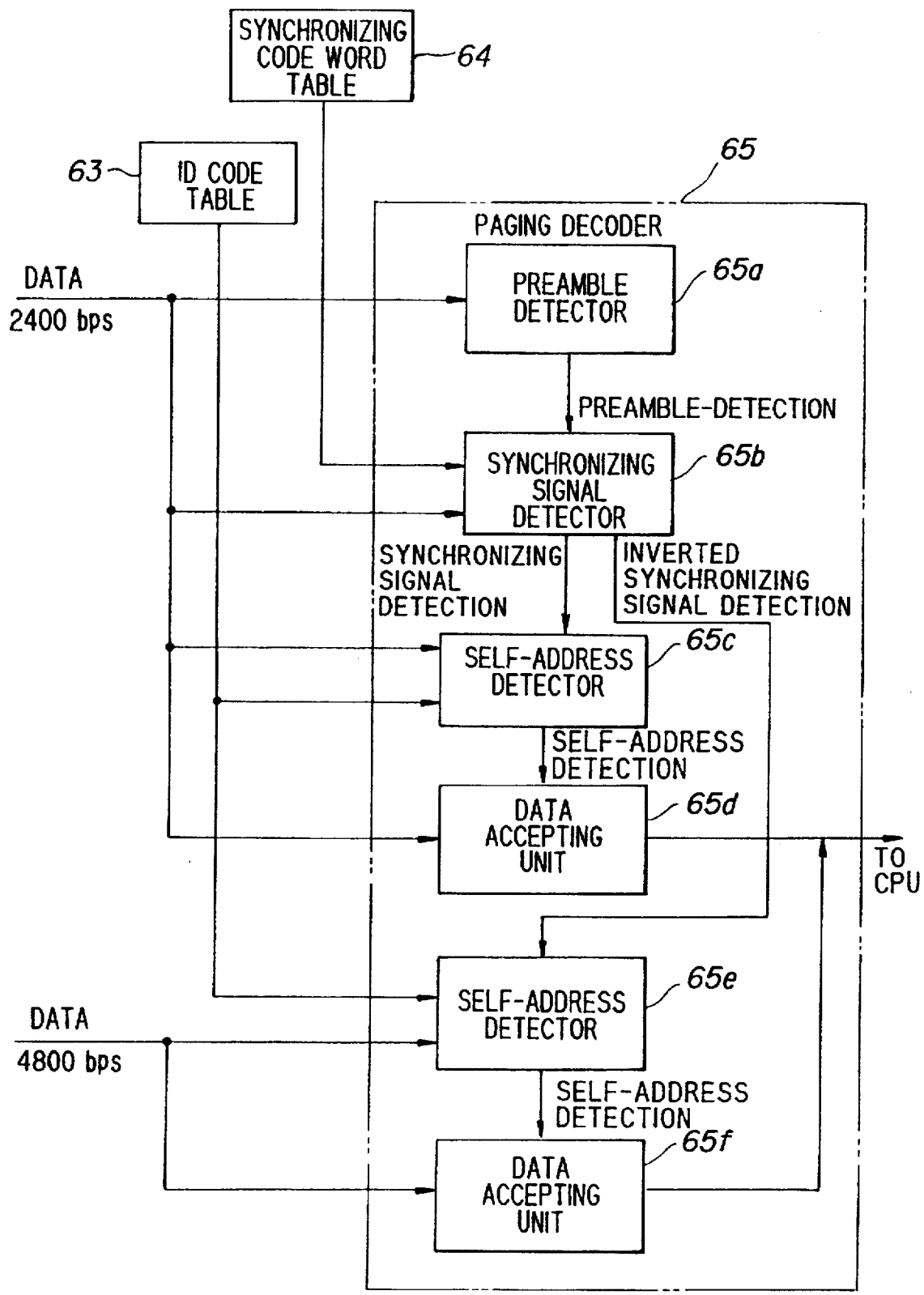
FIG. 16 is a block diagram showing the construction of a paging decoder.

FIG. 16 is a block diagram showing the construction of the paging decoder 65.

As shown in FIG. 16, the paging decoder 65 includes a preamble detector 65a for detecting the preamble sent to the decoder at 2400 bps; a synchronizing-signal detector 65b, which starts operation in response to detection of the preamble, for detecting the synchronizing signal (synchronizing code word SC and inverted synchronizing code word *SC) sent to the decoder at 2400 bps; a first self-address detector 65c for detecting the pager's own address from call data sent to the decoder at 2400 bps; a first data accepting unit 65d; a second self-address detector 65e for detecting the pager's own address from call data sent to the decoder at 4800 bps; and a second data accepting unit 65f.

The first self-address detector 65c starts operating when the synchronizing code word SC is detected, namely when the call data is sent to the decoder at 2400 bps. The self-address detector 65c uses the output of the waveform shaping unit 62h-2 (FIG. 12) to read in the call address which follows the synchronizing code word, and compares the call address with the pager's own address (which has been registered in the ID code table 63). If the two addresses agree, a signal indicative of detection of the pager's own address is entered into the first data accepting unit 65d, whereupon the latter accepts the message that follows the call address and enters the message into the microcomputer 66 (FIG. 11), which is the next stage.

(d-4) Overall operation

In a case where the telephone 1a (FIG. 2) places a call to the pocket pager 6a₁, the telephone number of the call control station 3 is dialed. As a result, the telephone 1a and the call control station 3 are interconnected via the public switching telephone network 2. An announcing device incorporated within the call control station 3 informs the calling party of the pocket pager call procedure by a recorded voice track, and the calling party enters the number of the pocket pager in accordance with the procedure. By using the internally provided subscriber memory 3a, the call control station 3 identifies the transmission rate conforming to the pocket pager number and the form of the pocket pager output [T/O (tone only, namely an audio output only), NP (numeric pager, namely a message display output using numerals), and IP (information pager, namely a message display using Chinese characters or kanji].

In a prefectural district where the transmission rate is 2400 bps, the call control station 3 assembles the code shown in FIG. 3A from the accepted calls and sends the signal to all of the base stations 4a–4m in the prefectural district at one time. This is performed at prescribed time intervals (every 30 seconds to every minute). In a prefectural district where the transmission rate is 4800 bps, the call control station 3 assembles the code shown in FIG. 3B from the accepted calls and sends the signal to all of the base stations 4a–4m in the prefectural district at one time. This is performed at prescribed time intervals (every 30 seconds to every minute).

Upon receiving the code shown in FIG. 3A or FIG. 3B from the call control station 3, the base stations 4a–4m transmit the code upon performing FSK modulation. More specifically, in a district where the transmission rate is 2400 bps, each base station receives the code shown in FIG. 3A and the "1", "0" logic of all bits constituting the code enters the FSK modulator 44 (FIG. 4) at 1200 Hz. The FSK modulator 44 raises and lowers the nominal frequency by 5 KHz on the basis of the "0", "1" logic to execute two-value modulation and sends the modulated signal to the pocket pagers. In a district where the transmission rate is 4800 bps, each base station receives the code shown in FIG. 3B, modulates the preamble PA and the inverted synchronizing code word *SC in the code by two values and transmits the results at the transmission rate of 2400 bps. The rest of the code, namely the call-data code word (groups), is modulated by four values and transmitted at the transmission rate of 4800 bps.

The demodulating circuit 62f (FIG. 12) of each of the pocket pagers 6a₁–6mj modulates the code data sent from the base station, and the low-pass filter 62g smoothes the demodulated signal and enters the smoothed signal into the four-value demodulating circuit 62i. The comparators 62i-1 - 63i-3 of the four-value demodulating circuit 62i compare the output level of the low-pass filter 62g with the first, second and third reference levels (+1 V, 0 V, −1 V), respectively, and output the comparison signals a, b, c, respectively. The comparison signals a, b, c enter the differentiating-pulse synthesizer 62j and the clock extraction circuit 62k, which cooperate to produce the reproduction clock signal CLr.

The second comparator 62i-2 compares the output level of the low-pass filter 62g with 0 (V) and outputs a binary ("1", "0") signal, which is indicative of high (H) and low (L) levels, respectively, in dependence upon the results of comparison. Accordingly, if the transmission rate is 2400 bps, "0", "1" can be discriminated by monitoring the output of the second comparator 62i-2.

The waveform shaping circuit 62h-2 reads the binary ("1", "0") signal from the second comparator 62i-2 in sync with the 2400 Hz reproduction clock signal CLr and applies the signal to the paging decoder 65. Meanwhile, the four-value/two-value converter 62i-4 internally generates a clock having a rate (=4800 Hz) that is double the rate of the reproduction clock CLr, accepts the output signals a, b, c of the respective comparators 62i-1 - 62i-3 as inputs, converts the four-value signals to two-values signals in sync with the 4800 Hz clock and feeds the result into the paging decoder 65 at the rate of 4800 bps.

Since the preamble PA is sent to the pager at 2400 bps regardless of the transmission rate of the call data, the preamble detector 65a (FIG. 16) monitors the preamble based upon the 2400 bps data outputted by the waveform shaping circuit 62h-2. Upon detecting the preamble PA, the preamble detector 65a applies a preamble-detection signal to the synchronizing-signal detector 65b. Upon starting operation in response to detection of the preamble, the synchronizing-signal detector 65b monitors the synchronizing code word SC or inverted synchronizing code word *SC from the 2400 bps data outputted by the waveform shaping circuit 62h-2.

The first self-address detector 65c starts operating when the synchronizing code word SC is detected, namely when the call data is sent to the pager at 2400 bps. Next, the self-address detector 65c uses the output of the waveform shaping unit 62h-2 to read in the call address that follows the synchronizing code word SC and then compares the call address with its own address. If the two agree, a self-address detection signal is fed into the data accepting unit 65d, whereupon the latter accepts the message that follows the call address and enters the message into the microprocessor 66 (FIG. 11).

When the inverted synchronizing code word *SC is detected, i.e., when the call data is sent to the pager at 4800 bps, on the other hand, the second self-address detector 65e starts operating, uses the output of the four-value FSK demodulating circuit 62i to read in the call address that follows the inverted synchronizing code word *SC and then compares the call address with its own address. If the two agree, a self-address detection signal is fed into the data accepting unit 65f, whereupon the latter accepts the message that follows the call address and enters the message into the microprocessor 66.

In response to reception of the pager's own address, the microprocessor 66 issues a ringing tone via the speaker 69 (FIG. 11) and displays the received message on the LCD panel 72 via the LCD controller 73.

If this arrangement is adopted, a single pocket pager will be capable of receiving call service in a service district where the transmission rate is 2400 bps and in a service district where the transmission rate is 4800 bps.

Further, regardless of whether the transmission rate of the call data is 2400 bps of 4800 bps, which is double the former, the preamble PA and the synchronizing code word are modulated by two values and sent to the pager at the transmission rate of 2400 bps. This means that it will suffice to provide the pocket pager with a 2400 bps preamble detector and a 2400 bps synchronizing code word detector. In addition, a common 2400 bps, 4800 bps clock extraction unit will suffice. As a result, the pocket pager can be made small in size and constructed to consume little electric power.

Though a case has been described above in which transmission is performed at a transmission rate of 2400 bps using two-value FSK and a transmission rate of 4800 bps using four-value FSK, this does not impose a limitation upon the invention. Prescribed combinations of modulation methods and transmission rates are possible, and signals of a plurality of types send in these combinations can be received.

Figure 17:
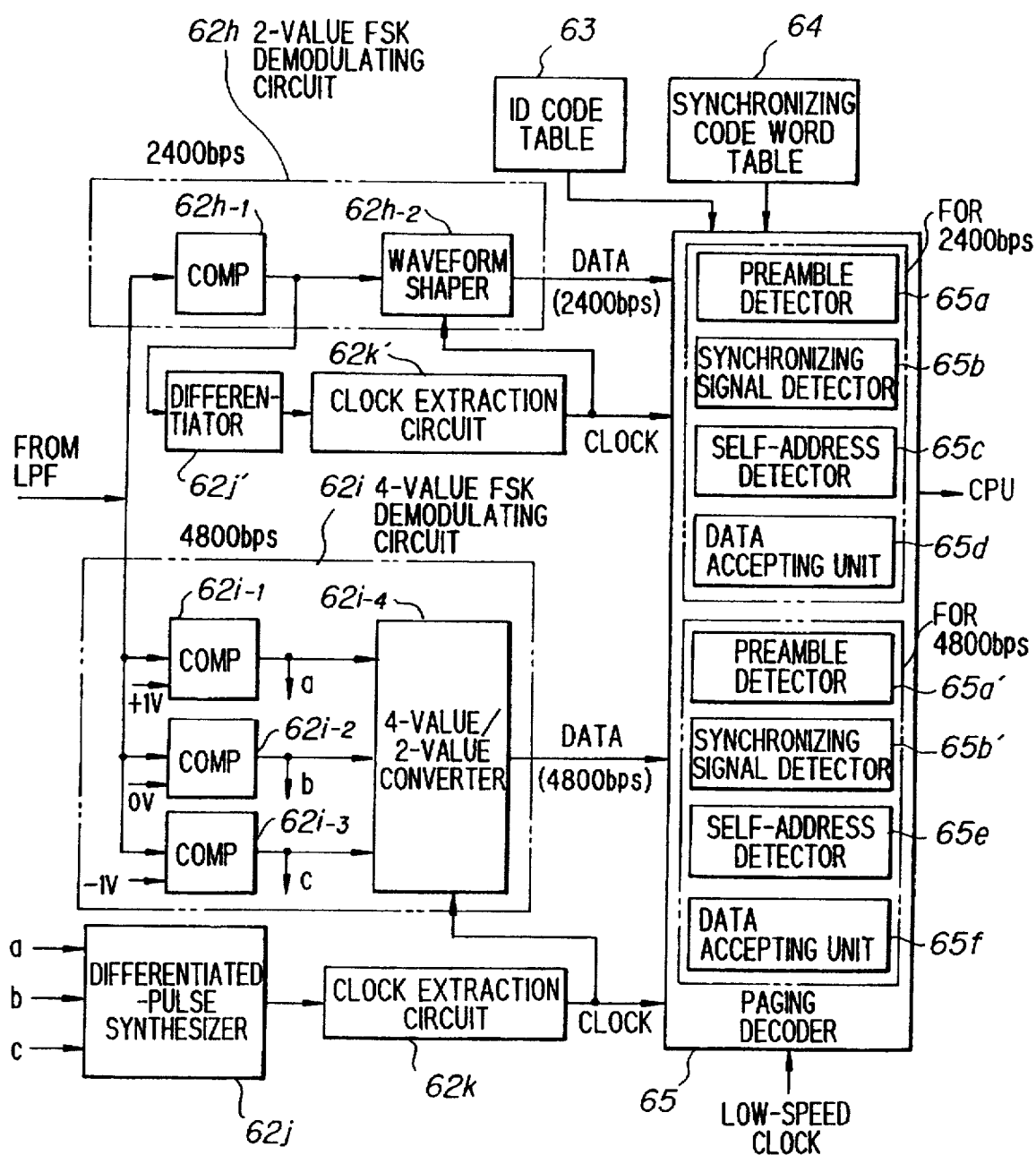
FIG. 17 is a block diagram which, for the purpose of comparison with the present invention, shows an arrangement conceivable for a case in which a preamble and synchronizing signal are transmitted at different rates.

FIG. 17 is a block diagram showing an arrangement conceivable for a pocket pager in a case where, unlike the present invention, all data inclusive of the preamble and synchronizing signal is subjected to two-value FSK modulation and transmitted at 2400 bps when the transmission rate is 2400 bps, and all data inclusive of the preamble and synchronizing signal is subjected to four-value FSK modulation and transmitted at 4800 bps when the transmission rate is 4800 bps. Elements in FIG. 17 identical with those shown in FIG. 12 are designated by like reference characters. It will be appreciated that when the transmission rate and modulation method of the preamble and synchronizing signal are changed, it becomes necessary to provide a clock extraction circuit, preamble detector and synchronizing code word detector for each scheme. Thus, unlike the arrangement of FIG. 12 according to the present invention, an extra comparator 62h-1, differentiating circuit 62j', clock extraction circuit 62k', preamble detector 64a' and synchronizing-signal detector 65b' must be provided.

(C) Second embodiment of the invention (a) Background

Figure 18A:
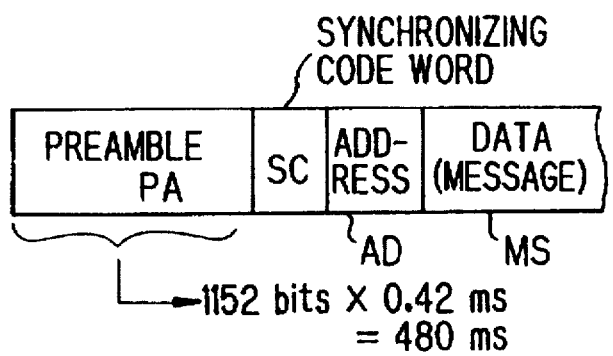
FIGS. 18A, 18B and 18C are diagrams for describing intermittent control.
Figure 18B:
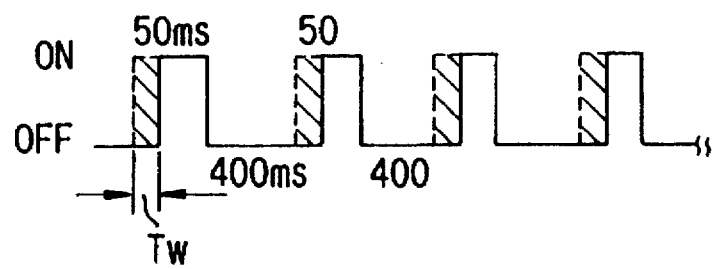
Figure 18C:
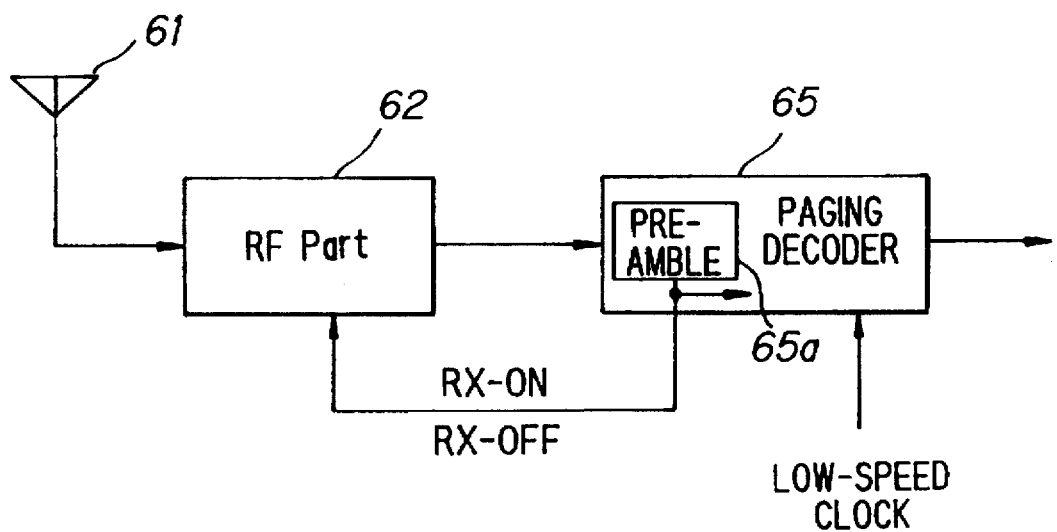

In a portable pager, intermittent operation is carried out in order to achieve reduced power consumption. The preamble PA in the code CCD is composed of repeated "1"s and "0"s of 1152 bits if the transmission rate is 2400 bps. The length of the preamble PA is 480 ms, as shown in FIG. 18A. Accordingly, in a case where the transmission rate is 2400 bps, pulses are internally generated at a period of 450 ms, which is less than 480 ms, an ON time of 50 ms and an OFF time of 400 ms, as illustrated in FIG. 18B. If the RF part 62 and preamble detector 65a operate only during ON time (RX-ON) and the preamble PA cannot be detected during this time, operation of the RF part 62, paging decoder 65 and other circuitry is halted (RX-OFF), as shown in FIG. 18C. The above-described operation is then repeated until the preamble PA is detected. When the preamble PA is detected, the ON operation of the RF part 62 is resumed and operation of the synchronizing-signal detector 65b is started. The synchronizing-signal detector 65b then detects the synchronizing code word. When the self-address detector subsequently detects its own address, a message is accepted and fed into the microprocessor 66, which responds by causing a ringing tone to be produced, by causing a message display to be presented, etc.

In case of RX-OFF, almost all of the circuitry is shut down and the current consumed is on the order of several tens of microamperes. At RX-ON, the current consumed is 2~3 mA and grows to several tens of milliamperes when a ringing tone is issued and a message displayed. Accordingly, by adopting the above-described intermittent operation, the amount of current consumed by the pocket pager can be reduced and power can be conserved.

In order for the analog receiving circuitry and logic circuitry operate stably, warming-up time is required. Accordingly, a fixed warming-up time Tw is provided, as indicated by the shaded portions in FIG. 18B.

Figure 19A:
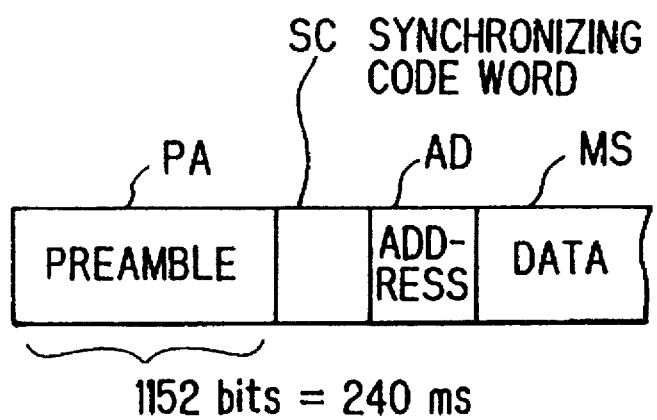
FIGS. 19A, 19B and 19C are diagrams for describing a problem with intermittent control according to the prior art.
Figure 19B:
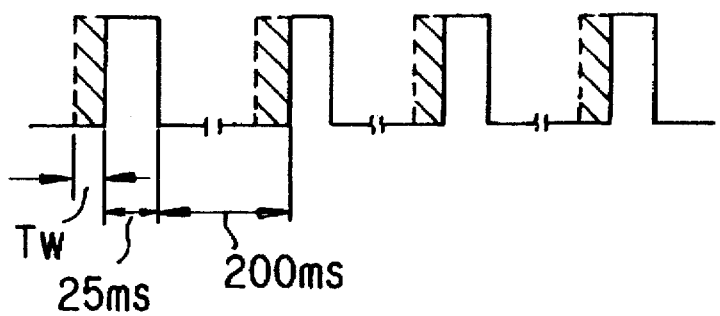
Figure 19C:
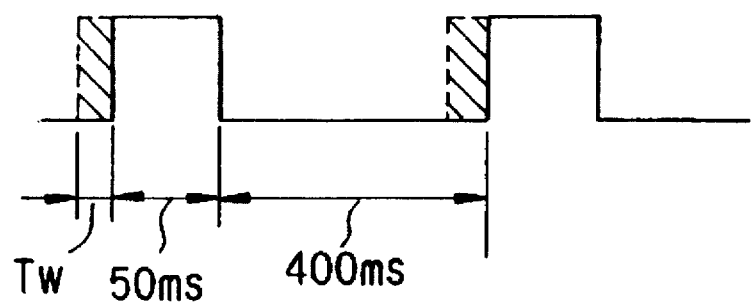

When the transmission rate is doubled to 4800 bps, the length of the preamble 1152 bits becomes 240 ms, as shown in FIG. 19A. Accordingly, in a case where the transmission rate is 4800 bps, pulses are internally generated at a period of 225 ms, which is less than 240 ms, an ON time of 25 ms and an OFF time of 200 ms, as illustrated in FIG. 19B. The RF part 62 and preamble detector 65a operate only during ON time (RX-ON). When the transmission rate is speeded up, the preamble becomes shorter, as mentioned above, and it is therefore necessary to perform the receiving operation more frequently. This means that the circuitry is turned on a greater number of times and the number of warming-up operations increases. Consequently, even if the reception ratio is the same, the RX-ON time lengthens for the sake of warm-up and, hence, more current is consumed. For example, when FIG. 19B for the transmission rate of 4800 bps and FIG. 19C for the transmission rate of 2400 bps are compared, it is found that the proportion for ON time is (2.Tw+50)/450 in the former and (Tw+50)/450 in the latter. Thus, in the case of the transmission rate of 4800 bps, extra current flows for the length of time Tw.

Accordingly, if the length of the preamble PA is held fixed regardless of the transmission rate, it is possible to reduce current consumption by intermittent reception even if a high transmission rate is employed.

(b) Frame structure

FIGS. 20A and 20B are diagrams for describing code structures (frame structures) and transmission rates according to the second embodiment of the invention. FIG. 20A shows the structure of a code in a case where modulation is performed by two-value FSK and transmission at a rate of 2400 bps, and FIG. 20B shows the structure of a code in a case where modulation is performed by four-value FSK and transmission at a rate of 4800 bps. Each code basically has the structure shown in FIG. 27 and is composed of a preamble PA and a plurality, or 40 in this example, of batches $BCH_1$~$BCH_{40}$. Each batch is composed of a 32-bit synchronizing signal (a synchronizing code word SC or inverted synchronizing code word *SC) and eight groups (frames) $GR_1$~$GR_8$.

The inverted synchronizing code word is the result of inverting the "1", "0" logic of the synchronizing code word. In order that the two-value FSK-modulated code data having a transmission rate of 2400 bps and four-value FSK-modulated code data having a transmission rate of 4800 bps can be distinguished from each other, the inverted synchronizing code word is added onto the code whose transmission rate is 4800 bps and the synchronizing code word is added onto the transmission rate whose transmission rate is 2400 bps. One frame is composed of four words in case of two-value FSK (2400 bps) and of eight words in case of four-value FSK (4800 bps).

At the transmission rate of 2400 bps, all bits constructing the code CCD undergo two-value FSK modulation and are transmitted at the rate of 2400 bps. In the case where the transmission rate is 4800 bps, the preamble PA and the inverted synchronizing code word *SC contained in the code CCD are FSK-modulated by two values and transmitted at the transmission rate of 2400 bps, but the rest of the code, namely the call-data code word (groups), is modulated by four values and transmitted at the transmission rate of 4800 bps.

The preamble PA in the code CCD is composed of repeated "1"s and "0"s of 1152 bits, and the length of the preamble is 480 ms, if the transmission rate is 2400 bps. The preamble PA is composed of repeated "1"s and "0"s of 1152 bits also in case of the transmission rate of 4800 bps, and since the preamble is transmitted at 2400 bps, its length is still 480 ms. Thus, the frame is constructed in such a manner that the preamble has the same length (480 ms) at a transmission rate of 2400 bps and at a transmission rate of 4800 bps. Since the length of the preamble PA is thus fixed regardless of the transmission rate, it is possible to reduce current consumption by intermittent reception even at a high transmission rate.

(c) Construction and operation of preamble detector

Figure 21:
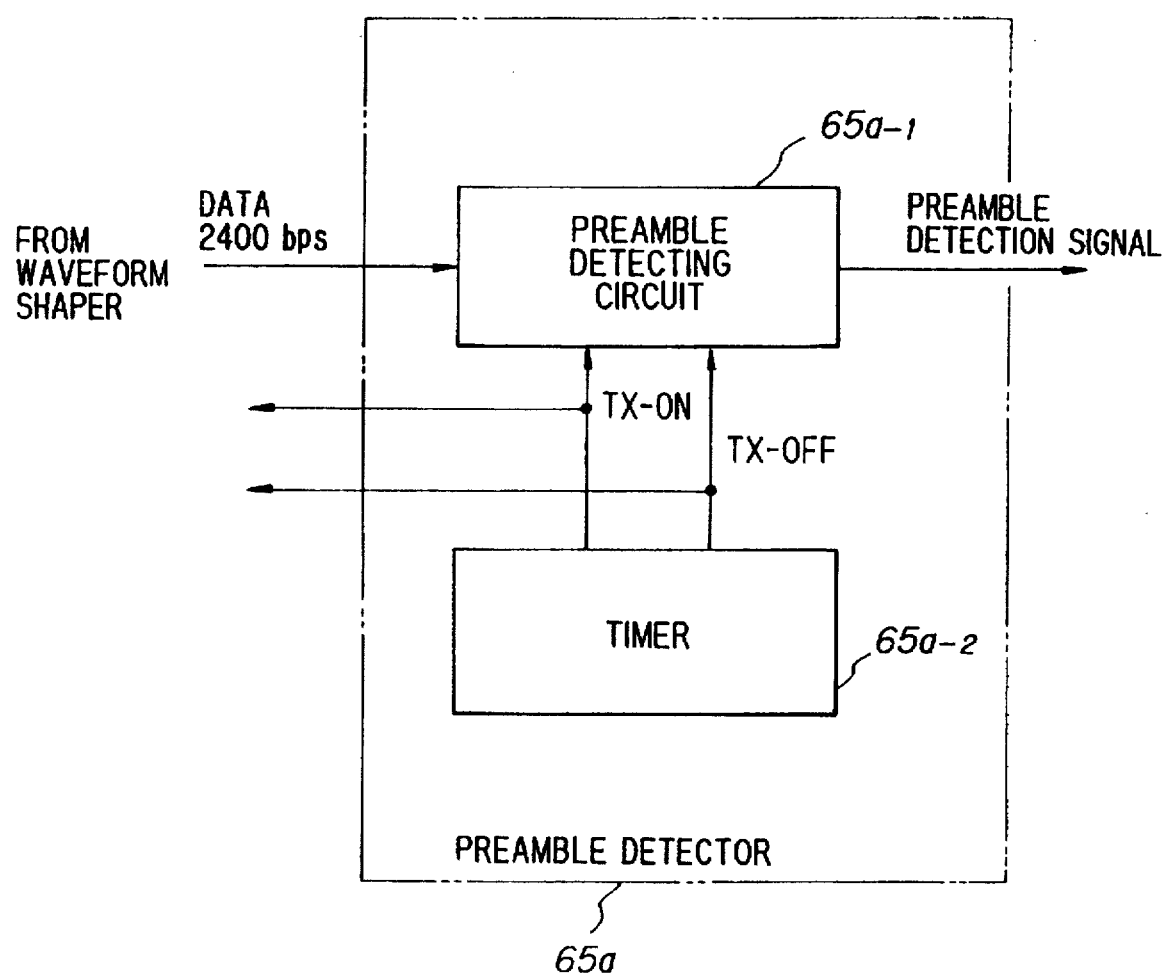
FIG. 21 is a block diagram illustrating a preamble detector.
Figure 22:
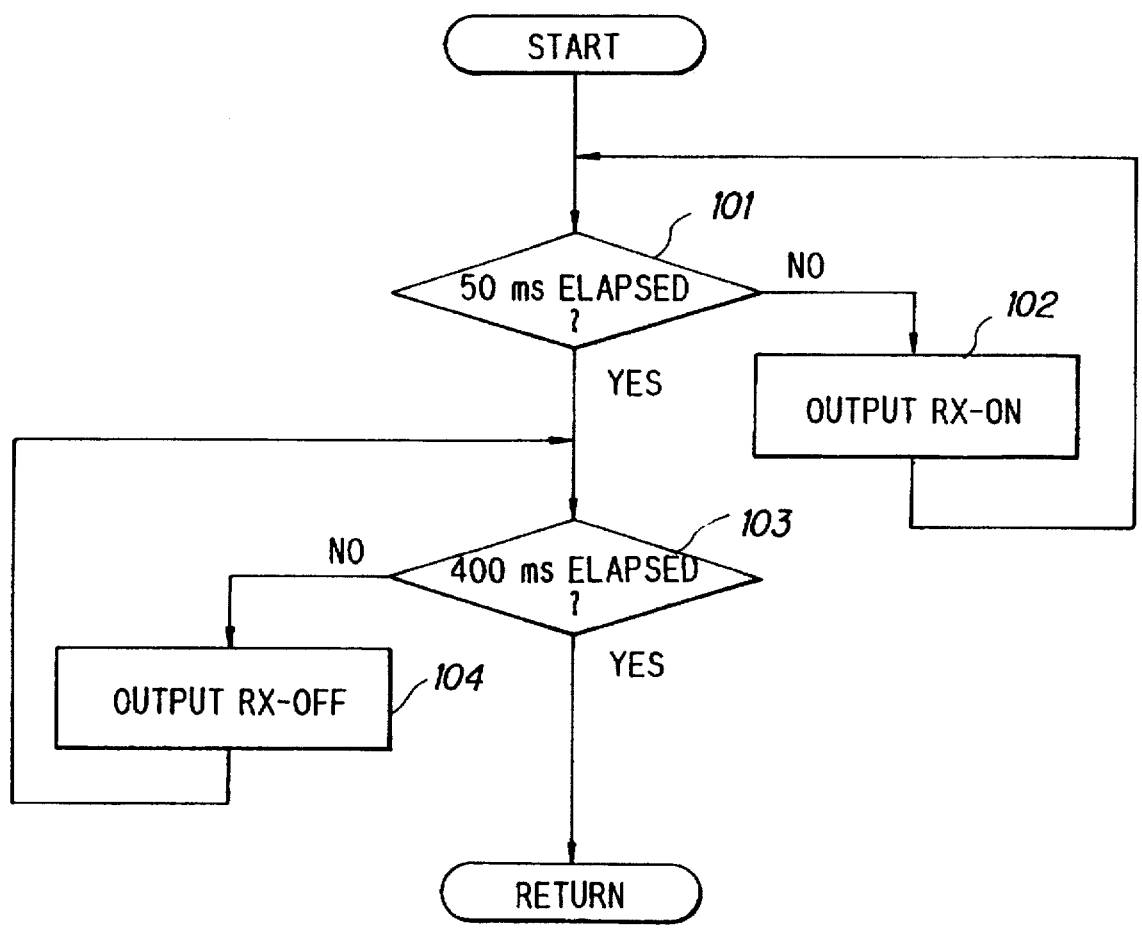
FIG. 22 is a flowchart showing timer operation in the preamble detector.

FIG. 21 is a block diagram showing the construction of the preamble detector 65a. The preamble detector 65a is connected to the waveform shaping circuit 62h-2 of FIG. 12 and executes detection of the preamble PA intermittently based upon the 2400 bps data outputted by the waveform shaping circuit 62h-2. As shown in FIG. 21, the preamble detector 65a includes a preamble detecting circuit 65a-1, and a timer 65a-2 for alternately generating a TX-ON signal having a width of 50 ms and a TX-OFF signal having a width of 400 ms at the timing illustrated in FIG. 18B. The preamble detecting circuit 65a-1 is enabled at the time of TX-ON to perform a preamble detecting operation, and is disabled at the time of TX-OFF, in which case the preamble detection operation is not carried out. FIG. 22 is a flowchart showing the timing operation of the timer 65a-2. Elapse of 50 ms of time starts being monitored at step 101. If this period of time has not elapsed, the RX-ON signal is outputted (step 102) and continues to be outputted until elapse is detected. If 50 ms of time elapses, elapse of 400 ms starts being monitored (step 103). If this period of time has not elapsed, the RX-OFF signal is outputted (step 104) and continues to be outputted until elapse is detected. If 400 ms of time elapses, the program returns to step 101 and processing from this step onward is repeated.

The foregoing relates to a case in which the length of the preamble is kept fixed (at 480 ms, for example) irrespective of the transmission rate. However, an arrangement may be adopted in which the code is transmitted with the ratio of the length of the preamble to the length of the call data code being held fixed regardless of transmission rate. For example, if a preamble for a case in which the transmission rate is 2400 bps is transmitted at 2400 bps and the bit length thereof is 1152 bits, then, when a preamble for a case in which the transmission rate is 4800 bps is transmitted at 4800 bps, the bit length of the preamble is made 2304 bits. Even if the ratio of the length of the preamble to the length of the call data code is thus held fixed regardless of the transmission rate, the length of the preamble can be made essentially constant and the current consumed can be reduced.

(D) Third Embodiment

In the foregoing embodiments, one base station transmits a code at one transmission rate (2400 bps or 4800 bps). However, it is also possible for a base station to transmit code data at a plurality of transmission rates by means of time division. The first and second embodiments are applicable in this case as well.

When codes having a plurality of transmission rates are transmitted on a single radio frequency channel by time division, traffic can cause a situation in which efficient operation is not obtained if the time the channel is occupied is fixed for each transmission rate. In other words, if there is uniformity of subscribers or traffic across a plurality of transmission rates, no particular problems arise if the time the channel is occupied is fixed for each transmission rate. However, since uniformity of subscribers or traffic is impossible, a call at a transmission rate for which the traffic is heavy will be delayed in time-division transmission in which occupation time is fixed. The result is inefficient operation.

Accordingly, it is desired that transmission be carried out by deciding the transmission time for each transmission rate dynamically in dependence upon traffic.

Figure 23:
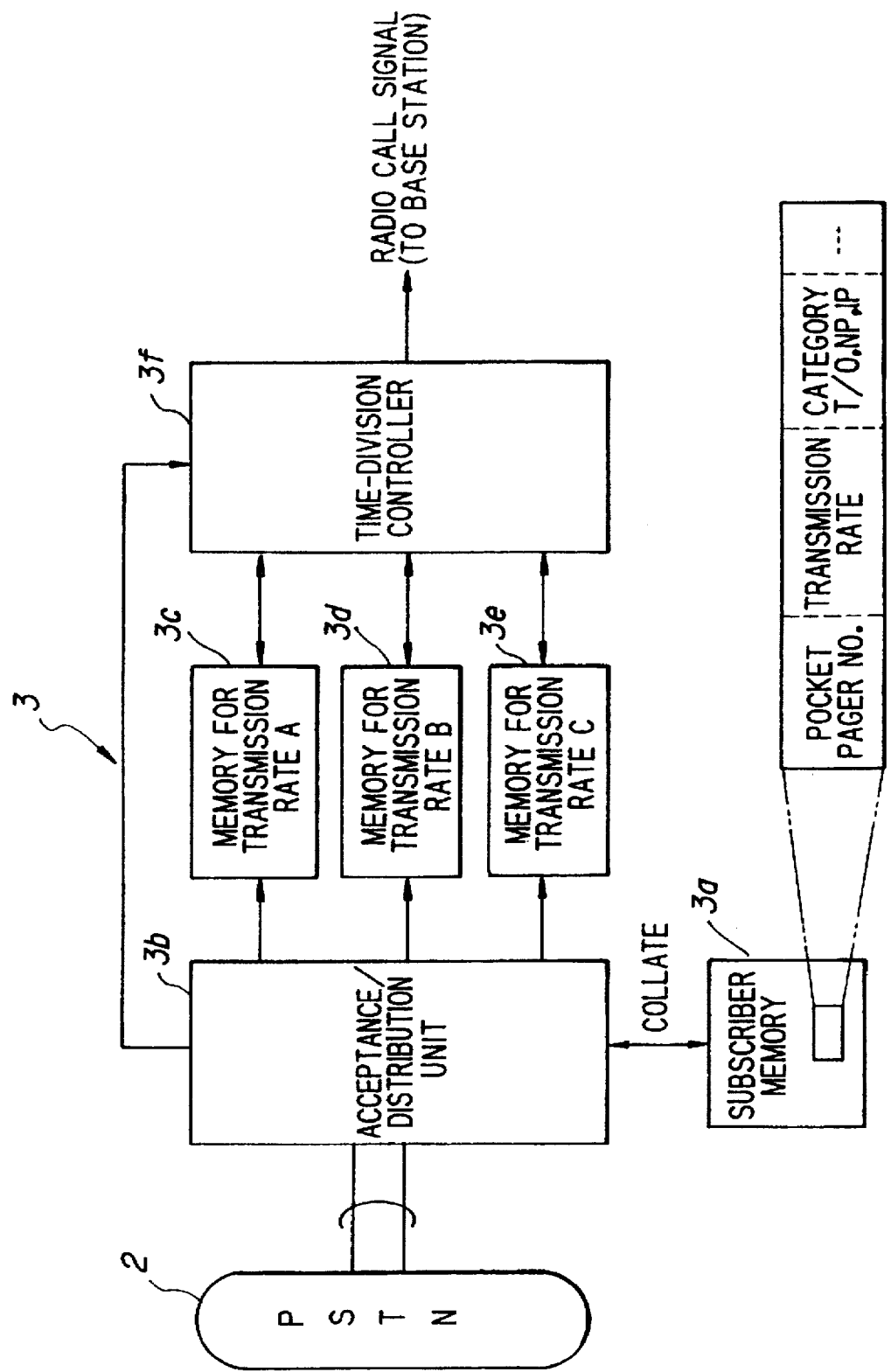
FIG. 23 is a block diagram showing the construction of a call control station in a case where time-division transmission is performed.

FIG. 23 is a block diagram showing the construction of a call control station in a case where transmission time is made variable in conformity with traffic. Numeral 2 denotes the public switching telephone network, and numeral 3 represents the call control station, which includes the subscriber memory $3a$ in which transmission rate and category of pager output (T/O, NP, IP) are stored in correspondence with each pager number; an acceptance/distribution unit $3b$ for accepting a pager call from the public switching telephone network, reading the transmission rate of the call out of the subscriber memory $3a$ and storing the call in a memory conforming to the transmission rate; a first memory $3c$ for storing a call having a transmission rate A (1200 bps, for example); a second memory for storing a call having a transmission rate B (2400 bps, for example); a third memory for storing a call having a transmission rate C (4800 bps, for example); a time-division controller $3f$ for deciding, at prescribed time intervals, lengths of transmission time ta, tb, tc conforming to the traffic of calls at each of the transmission rates, and for transmitting code data for each decided time to a base station in accordance with time division.

Figure 24:
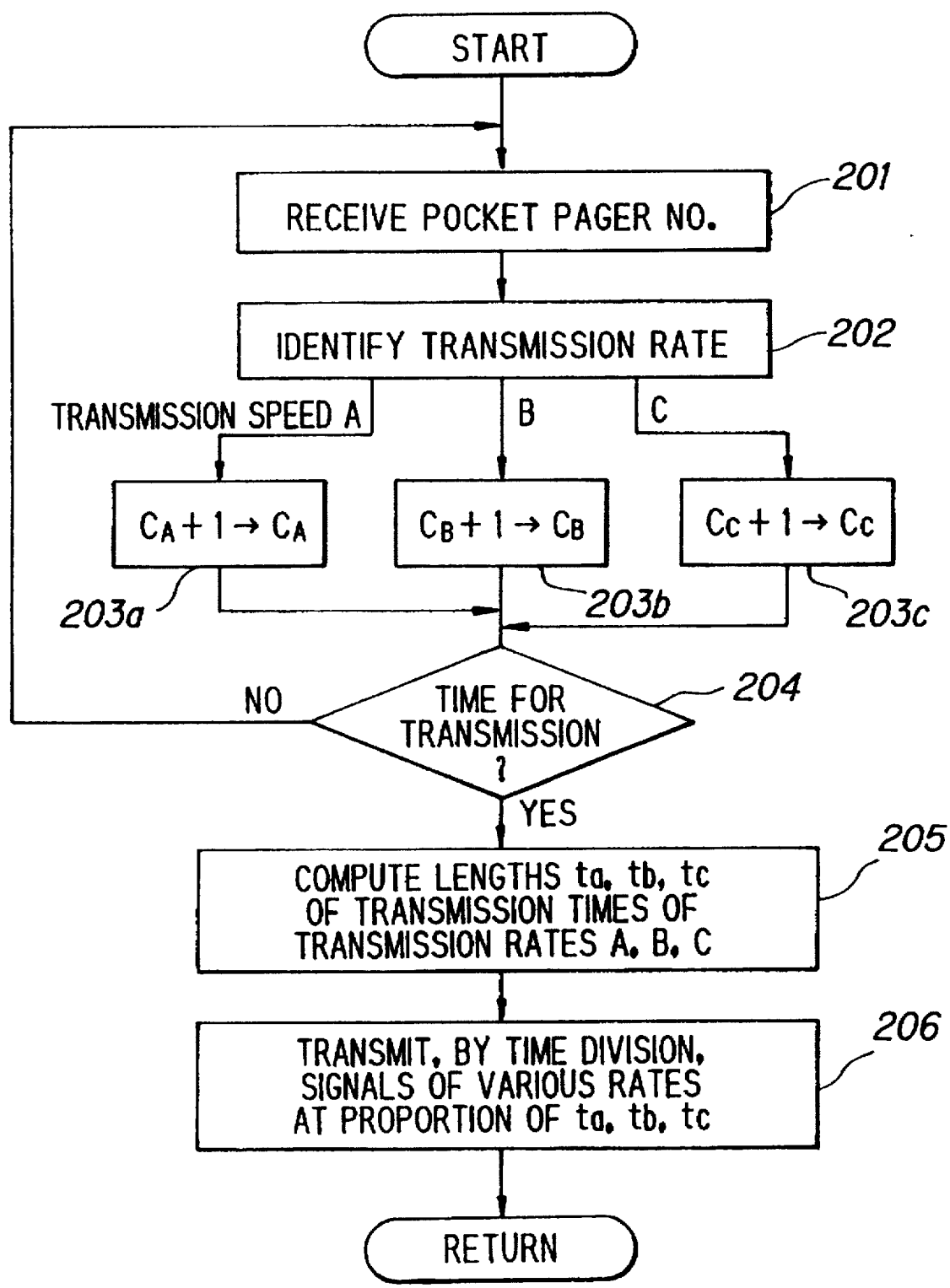
FIG. 24 is a flowchart of time-division transmission control.
Figure 25:
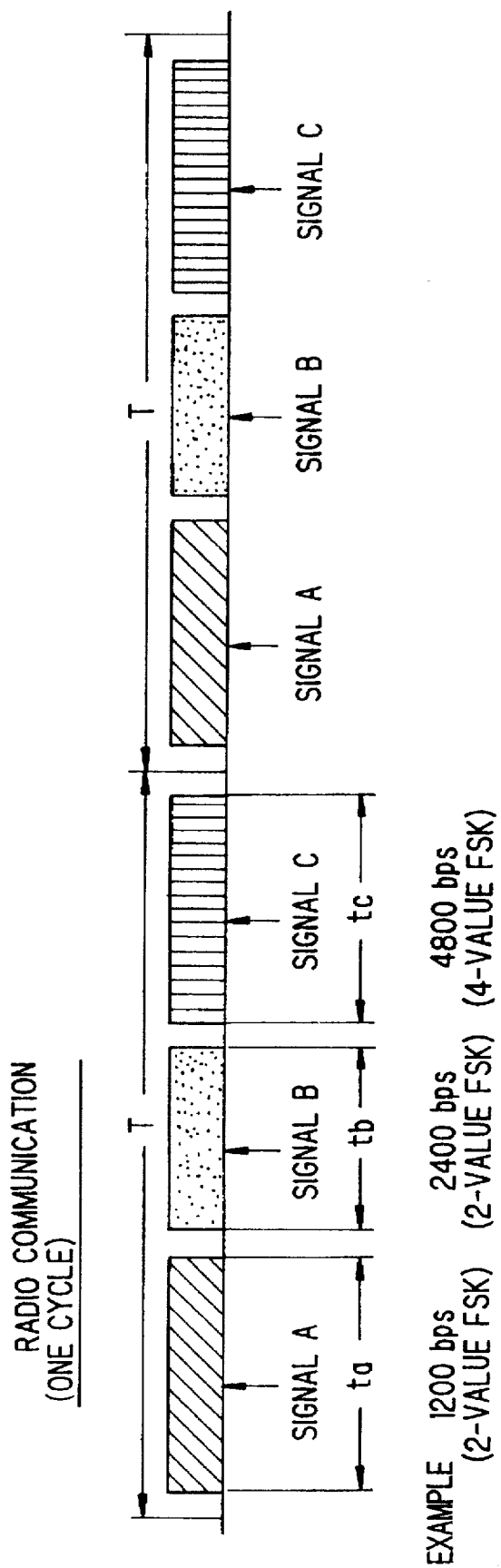
FIG. 25 is a diagram for describing transmission by variable-length, one-cycle time division.

FIG. 24 is a flowchart of time-division transmission control. When the number of a pocket pager is received (step 201), the acceptance/distribution unit 3b refers to the subscriber memory 3a to identify the transmission rate (step 202), counts up number CA (the initial value of which is zero) of calls in case of transmission rate A, counts up number $C_B$ (the initial value of which is zero) of calls in case of transmission rate B, counts up number CC (the initial value of which is zero) of calls in case of transmission rate C, and stores each call in memory (steps 203a, 203b, 203c).

Next, monitoring is performed to determine whether transmission time has arrived (step 204). If transmission time has not arrived, the program returns to step 201 and processing from this step onward is repeated. If transmission time has arrived, on the other hand, the time-division controller 3f computes the lengths of transmission time ta, tb, tc of the respective transmission rates in accordance with the following equations, in which T represents the transmission period (step 205):

$$ta = T \cdot C_A / (C_A + C_B + C_C)$$
$$tb = T \cdot C_B / (C_A + C_B + C_C)$$
$$tc = T \cdot C_C / (C_A + C_B + C_C)$$

Thereafter, the calls at the respective transmission rates are transmitted to the base station by time division in the proportion of the lengths of transmission time ta, tb, tc computed (step 206). As a result, the base station performs transmission by variable-length, one-cycle time division.

The foregoing relates to a case in which modulation is performed by two-value FSK and four-value FSK. In general, however, n-value FSK modulation (where n is an even number) and (n+2 m)-value FSK modulation (where m is a natural number) can be performed.

Thus, in accordance with the present invention, call service can be received by one and the same pocket pager in a service district having a first transmission rate (2400 bps, for example) and in a service district having a second transmission rate (4800 bps), which is double the first transmission rate.

Further, in accordance with the present invention, regardless of whether the transmission rate of call data is the first transmission rate (2400 bps, for example) or the second transmission rate (4800 bps), which is double the first, the preamble PA and the synchronizing code word are modulated by two values and transmitted to the pagers at the first transmission rate (2400 bps). This means that it suffices to provide the pager with a preamble detector and a synchronizing code word detector solely for the first transmission rate. Moreover, the clock extraction unit for the first and second transmission rates (2400 bps, 4800 bps) also can be a single common clock extraction unit. This makes it possible to reduce the size of the pager as well as the amount of power consumed.

Furthermore, in accordance with the present invention, prescribed combinations of modulation methods and transmission rates are possible, and signals of a plurality of types sent in such a combination can be received by a single pocket pager.

Further, in accordance with the present invention, when a code is transmitted at a second transmission rate that is twice the first transmission rate, the "1", "0" logic of the synchronizing code word at the first transmission rate is inverted and the resulting synchronizing code word (namely the inverted synchronizing code word) is transmitted. As a result, the modulation method and the transmission rate of the received code are identified so that the data can be received correctly.

Furthermore, in accordance with the present invention, a code is transmitted upon making the length of the preamble fixed irrespective of the transmission rate or upon making the ratio of the length of the preamble to the length of the call-data code word fixed irrespective of the transmission rate. As a result, the effectiveness of reducing power consumption by intermittent reception can be improved irrespective of the transmission rate.

In a case where information having a plurality of different transmission rates is transmitted by time division, the length of time for transmission of information at each transmission rate is decided on the basis of pager call traffic at each transmission rate, thereby making it possible to use radio communication efficiently.

As many apparently widely different embodiments of the present invention can be made without departing from the spirit and scope that thereof, it is to be understood that the invention is not limited to the specific embodiments thereof except as defined in the appended claims.

What is claimed is:

1. A code transmission system in which a code comprising a preamble and a plurality of batches, in which each of the plurality of batches is constituted by a synchronizing signal and one or more call-data, is transmitted from a base station to portable pagers each of which notifies its possessor of a call if an address contained in the call-data agrees with its own address, wherein:

in a first case where the code is transmitted at a first transmission rate, the base station modulates the entirety of the preamble, the synchronizing signal and the call-data in the code by n values (where n is an even number) and transmits them at said first transmission rate, whereas in a second case where the code is transmitted at a second transmission rate that is double said first transmission rate, the base station modulates the preamble and the synchronizing signal in the code by the n values, transmits them at said first transmission rate, modulates the call-data by (n+2 m) values (where m is a natural number) and transmits it at said second transmission rate; and each of the portable pagers performs detection of the preamble and synchronizing signal on the basis of the fact that modulation is by the n values and transmission rate is said fast transmission rate, and receives the ensuing call-data based upon this detection.

2. The system according to claim 1, wherein said modulation by n values is n-value frequency-shift keying modulation, and said modulation by (n+2 m) values is (n+2 m)-value frequency-shift keying modulation.

3. The system according to claim 1, wherein in the case where the code is transmitted at said second transmission rate, "1", "0" logic of the synchronizing signal prevailing in said first case where the code is transmitted at said first transmission rate is inverted and transmitted as the synchronizing signal.

4. The system according to claim 3, wherein each of the portable pagers demodulates the call-data by the (n+2 m) values when the logically inverted synchronizing signal is detected, and demodulates the call-data by the n values when the the logic of the synchronizing signal is not inverted.

5. The system according to claim 1, wherein the base station holds a length of the preamble constant irrespective of the transmission rate of the call-data.

6. The system according to claim 5, wherein said base station holds a ratio of the length of the preamble to a length of the call-data constant irrespective of the transmission rate of the call-data.

7. The system according to claim 1, wherein in a case where codes of a plurality of transmission rates are transmitted on a single radio frequency channel, the base station decides, on the basis of traffic of calls conforming to the transmission rates, lengths of time for transmission of codes of the respective transmission rates, and transmits the codes of the plurality of transmission rates by time division on the basis of the lengths of time decided.

8. A portable pager in a radio paging system in which the portable pager receives a code comprising a preamble and a plurality of batches, in which each of the plurality of batches is constituted by a synchronizing signal and one or more call-data, and notifies its possessor of a call if an address contained in the call-data agrees with its own address, which has been set in advance, the portable pager comprising:

- a receiver for receiving and demodulating the code sent from a base station;
- a detector for detecting the preamble and the synchronizing signal transmitted under modulation by n values (where n is an even number) and at a first transmission rate;
- a decision unit for determining, on the basis of whether the synchronizing signal has "1", "0" logic that is the inverse of that of the original synchronizing signal, whether the call-data has been modulated by the n values and transmitted at the first transmission rate or modulated by (n+2 m) values (where m is a natural number) and transmitted at a second transmission rate that is double the first transmission rate;
- an n-value demodulator for demodulation an n-value modulated signal to "1", "0" data;
- an (n+2 m) demodulator for demodulating an (n+2 m)-modulated signal to "11", "10", "01", "00" data;
- means for accepting the call-data via the n-value demodulator if result of the determination is that the call-data has been modulated by the n values and via the (n+2 m) demodulator if result of the determination is that the call-data has been modulated by the (n+2 m) values.

9. The portable pager according to claim 8, wherein said detector has a preamble detector and a synchronizing detector, said preamble detector operating the receiver for a prescribed time at a prescribed period to intermittently monitor whether the preamble has been detected, and if the preamble has been detected, continues operation of the receiver and starts operation of said synchronizing detector and other logic circuitry.

* * * * *